United States Patent
Yan et al.

(10) Patent No.: US 12,430,881 B2
(45) Date of Patent: Sep. 30, 2025

(54) IMAGE CLUSTERING METHOD AND APPARATUS, COMPUTER DEVICE, AND STORAGE MEDIUM

(71) Applicant: Tencent Technology (Shenzhen) Company Limited, Shenzhen (CN)

(72) Inventors: Jiangpeng Yan, Shenzhen (CN); Jianhua Yao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 335 days.

(21) Appl. No.: 18/135,880

(22) Filed: Apr. 18, 2023

(65) Prior Publication Data

US 2023/0298314 A1    Sep. 21, 2023

Related U.S. Application Data

(63) Continuation of application No. PCT/CN2022/099660, filed on Jun. 20, 2022.

(30) Foreign Application Priority Data

Aug. 9, 2021 (CN) .......................... 202110907973.3

(51) Int. Cl.
    *G06V 10/762*      (2022.01)
    *G06V 10/44*      (2022.01)
    *G06V 10/764*      (2022.01)

(52) U.S. Cl.
    CPC ............ *G06V 10/762* (2022.01); *G06V 10/44* (2022.01); *G06V 10/764* (2022.01)

(58) Field of Classification Search
    CPC .... G06V 40/172; G06V 10/764; G06V 10/82; G06V 20/30; G06V 10/762;
(Continued)

(56) References Cited

U.S. PATENT DOCUMENTS

| | | | |
|---|---|---|---|
| 2006/0083440 A1* | 4/2006 | Chen | H04N 23/698 382/284 |
| 2009/0110300 A1* | 4/2009 | Kihara | G06V 20/35 382/224 |

(Continued)

FOREIGN PATENT DOCUMENTS

| | | |
|---|---|---|
| CN | 107943984 A | 4/2018 |
| CN | 108268526 A | 7/2018 |

(Continued)

OTHER PUBLICATIONS

Li-Fei Chen et al., "A Hierarchical Method for Determining the Number of Clusters" Journal of Software, vol. 19, No. 1, Jan. 31, 2008, 11 pgs.

(Continued)

*Primary Examiner* — Alex Kok S Liew

(74) *Attorney, Agent, or Firm* — Morgan, Lewis & Bockius LLP

(57) ABSTRACT

This application discloses an image clustering method performed by a computer device. This method includes: determining a first clustering parameter based on M image groups; for a target image group, dividing it into two image groups to obtain M+1 reference image groups, and determining a reference clustering parameter based on the M+1 reference image groups as a second clustering parameter for the target image group representing a clustering degree of images in the M+1 reference image groups; choosing, among respective second clustering parameters of the M image groups, a target second clustering parameter representing the highest clustering degree of images in the M image groups; and when the target second clustering parameter has a clustering degree not lower than the first clustering parameter, dividing a target image group corresponding to (Continued)

the target second clustering parameter into two image groups to obtain M+1 image groups.

20 Claims, 9 Drawing Sheets

(58) Field of Classification Search
CPC .... G06V 10/993; G06V 20/69; G06V 40/168; G06V 40/171; G06V 40/173; G06V 40/165; G06V 40/175; G06V 10/774; G06V 20/698; G06V 30/413; G06V 10/44; G06V 10/454; G06V 10/457; G06V 2201/03; G06V 10/25; G06V 10/255; G06V 10/34; G06V 10/763; G06V 10/771; G06V 10/7715; G06V 10/772; G06V 20/35; G06V 10/16; G06V 10/267; G06V 10/443; G06V 10/464; G06V 10/60; G06V 10/74; G06V 10/751; G06V 10/761; G06V 10/7635; G06V 10/766; G06V 10/768; G06V 10/7784; G06V 10/95; G06V 20/10; G06V 20/13; G06V 20/40; G06V 20/64; G06V 20/693; G06V 20/695; G06V 2201/031; G06V 30/242; G06V 40/10; G06V 40/12; G06V 40/161; G06V 40/179; G06V 10/235; G06V 10/26; G06V 10/426; G06V 10/56; G06V 10/75; G06V 10/7625; G06V 10/77; G06V 10/776; G06V 20/52; G06V 20/54; G06V 20/625; G06V 20/70; G06V 2201/032; G06V 2201/10; G06V 30/19093; G06V 30/416; G06V 40/103; G06V 40/1365; G06V 40/19; G06V 40/193; G06V 40/197; G06V 40/50
See application file for complete search history.

(56) References Cited

U.S. PATENT DOCUMENTS

| | | | |
|---|---|---|---|
| 2010/0172555 A1* | 7/2010 | Hasezawa | G06V 10/7715 382/128 |
| 2012/0330957 A1* | 12/2012 | Nagano | G06F 12/121 707/E17.089 |

FOREIGN PATENT DOCUMENTS

| | | |
|---|---|---|
| CN | 109034086 A | 12/2018 |
| CN | 109447186 A | 3/2019 |
| CN | 110796164 A | 2/2020 |
| CN | 114283299 A | 4/2022 |
| JP | 2012048641 A | 3/2012 |
| JP | 2014093058 A | 5/2014 |
| WO | WO 2021029835 A1 | 2/2021 |

OTHER PUBLICATIONS

Maria Halkidi et al., "Clustering Validity Assessment: Finding the Optimal Partitioning of a Data Set", Department of Informatics, 2001 IEEE, 8 pgs.
Tencent Technology, ISR, PCT/CN2022/099660, Aug. 29, 2022, 3 pgs.
Hiroaki Tani et al., "Index Generation for Image Retrieval by Integrating Multiple Layers of DCNNs", Information Processing Society of Japan, SIG Technical Report, vol. 2019-CVIM-219, No. 4, Nov. 2017, 7 pgs., Retrieved from the Internet: https://www.ipsj.or.jp/english/index.html.
SID Lamrous et al., "Divisive Hierarchical K-Means", International Conference on Computational Intelligence for Modelling Control and Automation and International Conference on Intelligent Agents Web Technologies and International Commerce, IEEE, Nov./Dec. 2006, 7 pgs., Retrieved from the Internet: https://ieeexplore.ieee.org/abstract/document/4052665.
Tencent Technology, WO, PCT/CN2022/099660, Aug. 29, 2022, 5 pgs.
Tencent Technology, IPRP, PCT/CN2022/099660, Feb. 13, 2024, 6 pgs.
Tencent Technology, Extended European Search Report, EP Patent Application No. 22855072.9, Aug. 9, 2024, 7 pgs.
Mattis van den Bergh et al., "Deciding on the Starting Number of Classes of a Latent Class Tree", Sociological Methodology, vol. 48, No. 1, Jun. 2018, 34 pgs., Retrieved from the Internet: https://journals.sagepub.com/doi/full/10.1177/0081175018780170.
Naiallen Carolyne Rodrigues et al., "Bisecting Stochastic Clustering: A New Algorithm for PolSAR Image Unsupervised Classification", National Institute for Space Research INPE Postgraduate Program in Applied Computing, Nov. 2020, 11 pgs., Retrieved from the Internet: http://mtc-m21c.sid.inpe.br/col/sid.inpe.br/mtc-m21c/2020/12.28.13.44/doc/publicacao.pdf.
Sergio M. Savaresi et al., "Choosing the Cluster to Split in Bisecting Divisive Clustering Algorithms", Computer Science & Engineering (CS&E) Technical Reports, University Digital Conservancy, Oct. 2000, 16 pgs., Retrieved from the Internet: https://hdl.handle.net/11299/215443.

* cited by examiner

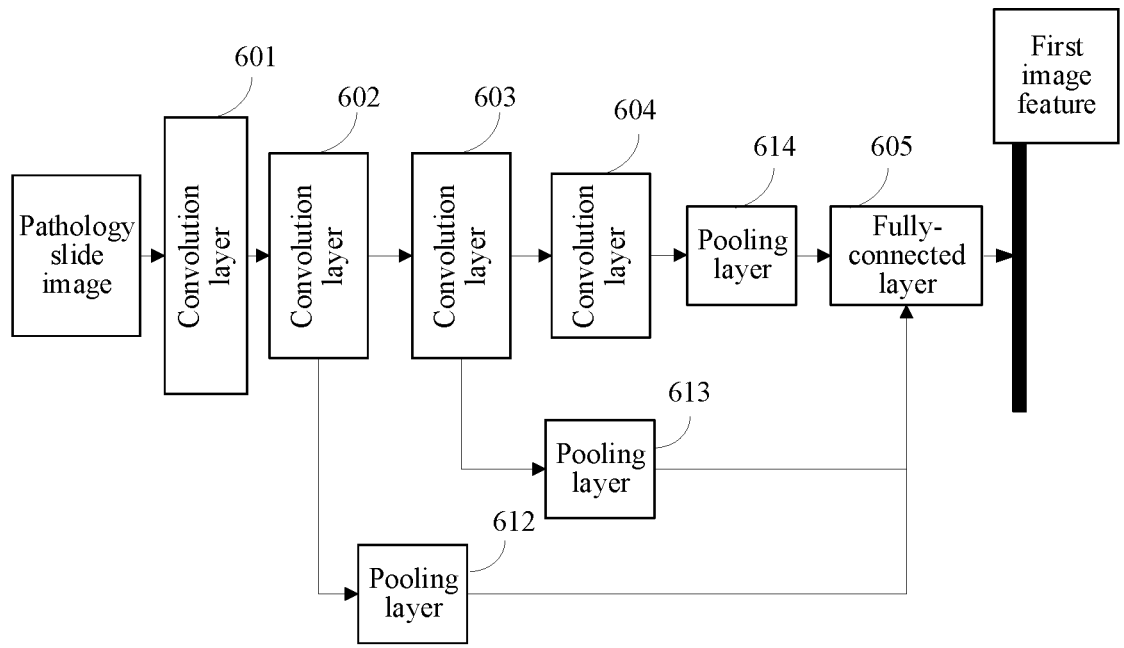

FIG. 6

| For each image in M image groups, a computer device determines an aggregation parameter and a separation parameter corresponding to the image, based on a second image feature of the image, second image features of the other images in an image group to which the image belongs, and second image features of images in the other image groups | 701 |

↓

| The computer device determines a clustering sub-parameter corresponding to the image based on the aggregation parameter and the separation parameter. | 702 |

↓

| The computer device determines a first clustering parameter based on the respective clustering sub-parameters of the images in the M image groups | 703 |

FIG. 7

IMAGE CLUSTERING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2022/099660, entitled "IMAGE CLUSTERING METHOD AND APPARATUS, COMPUTER DEVICE, AND STORAGE MEDIUM" filed on Jun. 20, 2022, which claims priority to Chinese Patent Application No. 202110907973.3, entitled "IMAGE CLUSTERING METHOD AND APPARATUS, COMPUTER DEVICE, AND STORAGE MEDIUM" filed with the China National Intellectual Property Administration on Aug. 9, 2021, all of which is incorporated herein by reference in its entirety.

FIELD OF THE TECHNOLOGY

Embodiments of this application relate to the field of artificial intelligence technology, and in particular to image clustering technology.

BACKGROUND OF THE DISCLOSURE

With the continuous development of computer technology, there is an increasing demand for image processing. Image clustering is a commonly used image processing method, and image clustering is used to classify a plurality of images into several different classes. In related technologies, a target number of classes are usually predetermined, and then a plurality of images are classified into these classes by using a clustering algorithm. However, at present, the clustering degree achieved after image clustering using the clustering algorithm is not high enough.

SUMMARY

Embodiments of this application provide an image clustering method and apparatus, a computer device, and a storage medium, capable of improving the clustering degree of image clustering. The technical solutions are as follows:

According to one aspect, provided is an image clustering method, performed by a computer device, the method including:
  determining a first clustering parameter based on M image groups, the first clustering parameter representing a clustering degree of images in the M image groups, and M being an integer greater than 1;
  for any target image group in the M image groups, dividing the target image group into two image groups to obtain M+1 reference image groups, and determining a reference clustering parameter based on the M+1 reference image groups as a second clustering parameter for the target image group, the second clustering parameter representing a clustering degree of images in the M+1 reference image groups;
  choosing, among respective second clustering parameters of the M image groups, a target second clustering parameter representing the highest clustering degree of images in the M image groups; and
  when a clustering degree represented by the target second clustering parameter is not lower than the clustering degree represented by the first clustering parameter, dividing a target image group corresponding to the target second clustering parameter into two image groups to obtain M+1 image groups.

According to another aspect, provided is a computer device, where the computer device includes a processor and a memory, the memory has at least one computer program stored therein, and the at least one computer program, when executed by the processor, causing the computer device to implement the operations executed in the image clustering method described in the above aspect.

According to another aspect, provided is a non-transitory computer-readable storage medium storing at least one computer program therein, and the at least one computer program, when executed by a processor of a computer device, causing the computer device to implement the operations executed in the image clustering method described in the above aspect.

According to the method and apparatus, the computer device, and the storage medium provided in the embodiments of this application, a second clustering parameter obtained after each image group in M image groups is divided into two new image groups is separately determined; and when a clustering degree represented by a target second clustering parameter (the second clustering parameter representing the highest clustering degree among respective second clustering parameters of the M image groups) is not lower than a clustering degree represented by a first clustering parameter before the dividing, it means that dividing an image group corresponding to the target second clustering parameter into two new image groups can improve the clustering degree of images in the image group, such that the image group is divided into two new image groups to obtain M+1 image groups, thereby achieving further division of the M image groups, facilitating further distinguishing confusable images, and then improving the clustering degree of image clustering.

BRIEF DESCRIPTION OF THE DRAWINGS

FIG. 6 is a schematic diagram of a first feature extraction network according to an embodiment of this application.

FIG. 7 is a flowchart of determining a clustering parameter according to an embodiment of this application.

DESCRIPTION OF EMBODIMENTS

To make objectives, technical solutions, and advantages of embodiments of this application clearer, the following further describes in detail implementations of this application with reference to the accompanying drawings.

An image clustering method provided in the embodiments of this application relates to computer vision technology in artificial intelligence technology, and the image clustering method provided in the embodiments of this application will be described below.

The image clustering method provided in the embodiments of this application is executable to a computer device. In some embodiments, the computer device may be a terminal or a server. The server may be an independent physical server, or a server cluster or a distributed system formed by a plurality of physical servers, or a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, etc., but is not limited thereto.

In a possible implementation, a computer program involved in the embodiments of this application may be deployed on a single computer device so as to be executed, or deployed on a plurality of computer devices at one location so as to be executed, or deployed on a plurality of computer devices distributed at a plurality of locations and interconnected through a communication network so as to be executed, where the plurality of computer devices distributed at a plurality of locations and interconnected through a communication network can form a blockchain system.

In a possible implementation, a computer device in the embodiments of this application is a node in a blockchain system, the node can store a plurality of image groups obtained by clustering in the blockchain, and then the node or other nodes in the blockchain can obtain the plurality of image groups from the blockchain.

Figure 1:
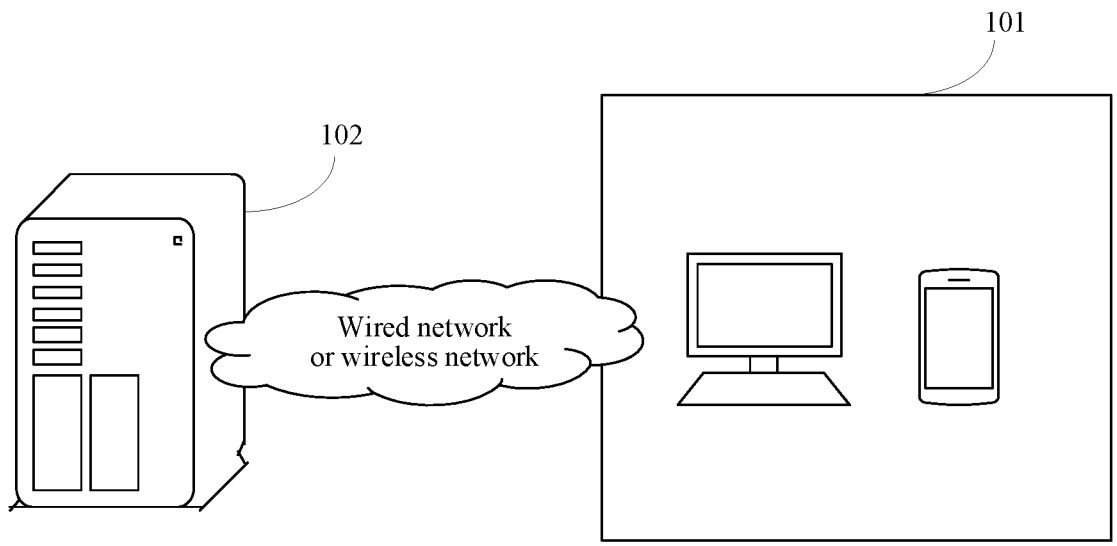
FIG. 1 is a schematic diagram of an implementation environment according to an embodiment of this application.

FIG. 1 is a schematic diagram of an implementation environment according to an embodiment of this application. The implementation environment includes a terminal 101 and a server 102. The terminal 101 and the server 102 are connected through a wireless or wired network.

In a possible implementation, the terminal 101 sends a plurality of images to the server 102, the server 102 may use the method provided in the embodiment of this application to perform image clustering on the plurality of received images to obtain a plurality of image groups, and then the server 102 returns the plurality of image groups to the terminal 101.

In another possible implementation, a target application for a service provided by the server 102 is installed on the terminal 101, and the terminal 101 may implement functions such as image processing or image transmission through the target application. For example, the target application is an image processing application, and the image processing application can perform image clustering on a plurality of images. The server 102 is configured to train an image classification model and deploy a trained image classification model into the target application. When running the target application, the terminal 101 can call the image classification model to classify a plurality of images to obtain a plurality of image groups, and then use the method provided in the embodiment of this application to continue to cluster the plurality of image groups to obtain a plurality of image groups having a higher clustering degree.

Figure 2:
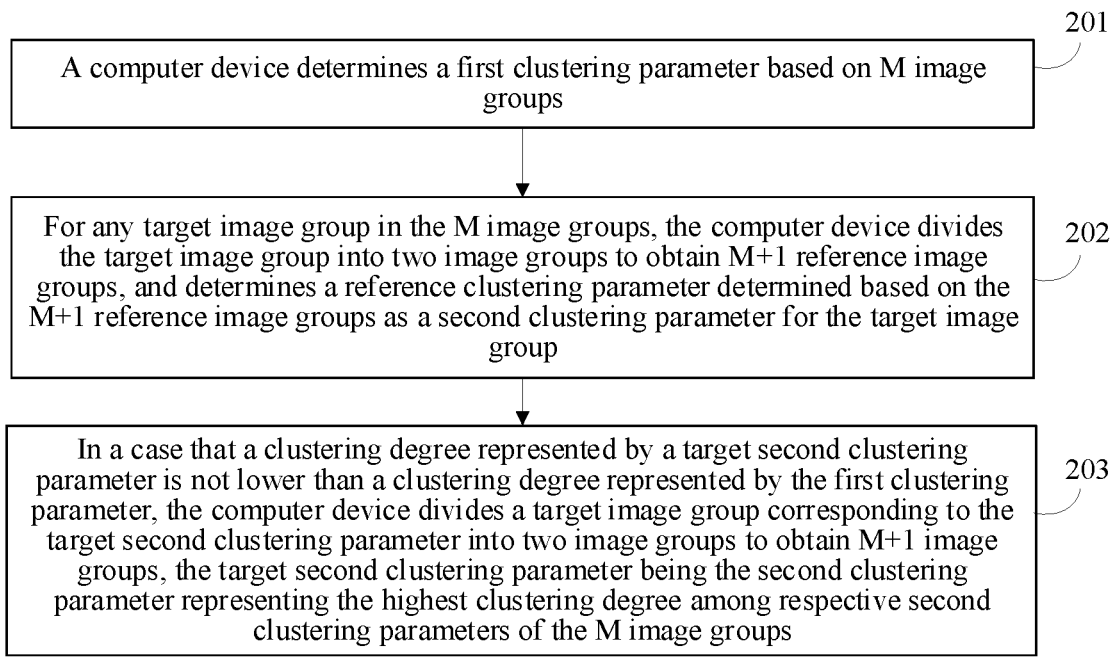
FIG. 2 is a flowchart of an image clustering method according to an embodiment of this application.

FIG. 2 is a flowchart of an image clustering method according to an embodiment of this application. An execution subject of the embodiment of this application is a computer device. In some embodiments, the computer device may be the terminal or the server in the above embodiment corresponding to FIG. 1. Referring to FIG. 2, the method includes the following steps:

201. The computer device determines a first clustering parameter based on M image groups.

The computer device obtains M image groups, where M is an integer greater than 1, and each image group includes at least one image. The similarity between images belonging to a same image group is high, and the similarity between images belonging to different image groups is low, and each image group can be regarded as a cluster.

The computer device determines the first clustering parameter based on the M image groups, where the first clustering parameter represents a clustering degree of images in the M image groups. In general, the greater the first clustering parameter, the higher the clustering degree between images, and the smaller the first clustering parameter, the lower the clustering degree between images. The clustering degree reflects an aggregation degree between images in a same image group, and a separation degree between images in different image groups. The higher the aggregation degree between images in a same image group and the higher the separation degree between images in different image groups, the higher the clustering degree between the images in the M image groups.

202. For any target image group in the M image groups, the computer device divides the target image group into two image groups to obtain M+1 reference image groups, and determines a reference clustering parameter based on the M+1 reference image groups as a second clustering parameter for the target image group.

Each image group in the M image groups can be regarded as a target image group. For any target image group in the M image groups, the computer device divides the target image group into two image groups and uses the two image groups and M−1 image groups in the M image groups other than the target image group as reference image groups, such that M+1 reference image groups can be obtained. The computer device determines a reference clustering parameter based on the M+1 reference image groups, and determines the reference clustering parameter as a second clustering parameter for the target image group, where the second clustering parameter represents a clustering degree of images in the M+1 reference image groups.

The computer device performs the operation in step 202 on each image group in the M image groups, such that the second clustering parameter for each image group in the M image groups can be obtained, that is, M second clustering parameters are obtained.

203. When a clustering degree represented by a target second clustering parameter is not lower than the clustering degree represented by the first clustering parameter, the computer device divides a target image group corresponding to the target second clustering parameter into two image groups to obtain M+1 image groups, where the target second clustering parameter is the second clustering parameter representing the highest clustering degree among respective second clustering parameters of the M image groups.

Since the second clustering parameter represents the clustering degree of the images in the M+1 reference image groups, the computer device can determine the second clustering parameter representing the highest clustering degree among the obtained second clustering parameters of the M image groups as the target second clustering parameter. Accordingly, after the target image group corresponding to the target second clustering parameter is divided into two image groups, the obtained clustering degree of the images of the M+1 reference image groups is the highest. That is, when there is a need to divide an image group in the M image groups into two image groups, the target image group corresponding to the target second clustering parameter is divided into two image groups, such that the clustering degree of the images is the highest. This dividing method is the best dividing method.

It is to be understood that, when the greater the clustering parameter, the higher the represented clustering degree, the target second clustering parameter is the greatest second clustering parameter among respective second clustering parameters of the M image groups; and in the case that the smaller the clustering parameter, the higher the represented clustering degree, the target second clustering parameter is the smallest second clustering parameter among respective second clustering parameters of the M image groups.

The computer device compares the clustering degree represented by the target second clustering parameter with the clustering degree represented by the first clustering parameter. When the clustering degree represented by the target second clustering parameter is not lower than the clustering degree represented by the first clustering parameter, after the target image group corresponding to the target second clustering parameter is divided into two image groups, the clustering degree of images is not lower than the clustering degree of the images of the original M image groups. As a result, the computer device divides the target image group corresponding to the target second clustering parameter into two image groups to obtain M+1 image groups. In another embodiment, when the clustering degree represented by the target second clustering parameter is lower than the clustering degree represented by the first clustering parameter, after the target image group corresponding to the target second clustering parameter is divided into two image groups, the clustering degree of images is lower than the clustering degree of the images of the original M image groups. As a result, the computer device no longer divides any image group in the M image groups.

According to the method provided in the embodiment of this application, a second clustering parameter obtained after each image group in M image groups is divided into two new image groups is separately determined; and when a clustering degree represented by a target second clustering parameter is not lower than a clustering degree represented by a first clustering parameter before the dividing, it means that dividing an image group corresponding to the target second clustering parameter into two new image groups can improve the clustering degree of images in the image group, such that the image group is divided into two new image groups to obtain M+1 image groups, thereby achieving further division of the M image groups, facilitating further distinguishing confusable images, and then improving the clustering degree of image clustering.

Figure 3:
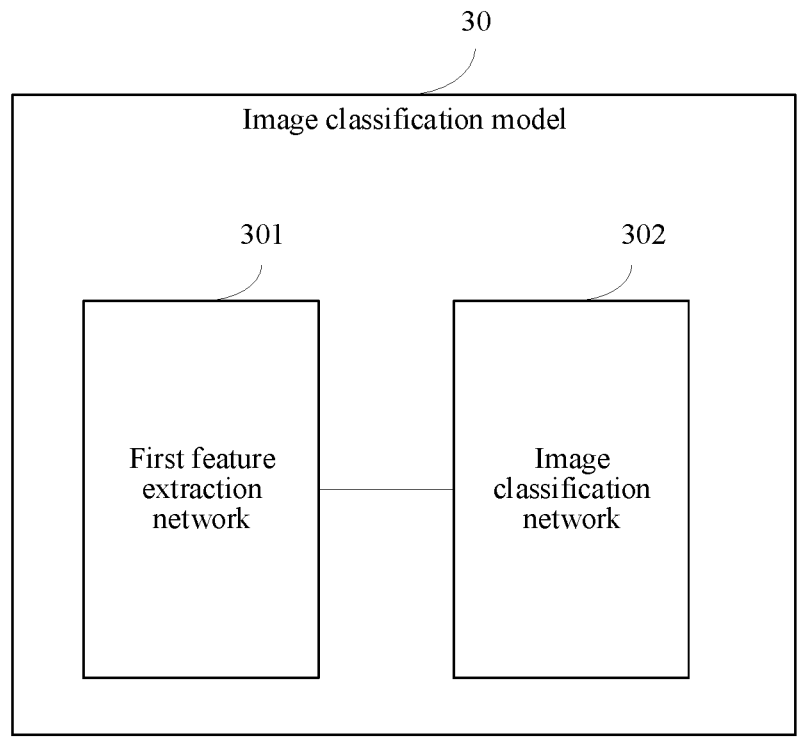
FIG. 3 is a schematic diagram of an image classification model according to an embodiment of this application.

In some embodiments, M image groups are obtained by division according to a classification result of an image classification model for a plurality of images, and the image classification mode is configured to classify the images and obtain class labels of the images. FIG. 3 is a schematic diagram of an image classification model according to an embodiment of this application. As shown in FIG. 3, an image classification model 30 includes a first feature extraction network 301 and an image classification network 302, the first feature extraction network 301 is connected to the image classification network 302, the first feature extraction network 301 is configured to perform feature extraction on images, the image classification network 302 is configured for classification based on image features.

Figure 4:
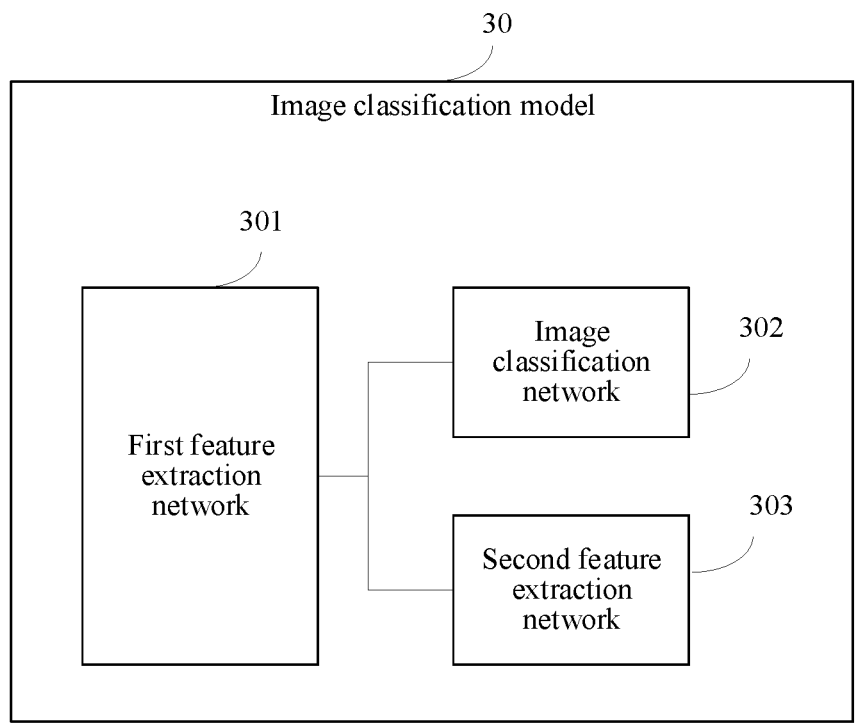
FIG. 4 is a schematic diagram of another image classification model according to an embodiment of this application.

In a possible implementation, as shown in FIG. 4, the image classification model 30 further includes a second feature extraction network 303, the second feature extraction network 303 is connected to the first feature extraction network 301, and the second feature extraction network 303 is configured to continue to perform feature extraction on the image features extracted by the first feature extraction network 301.

Figure 5:
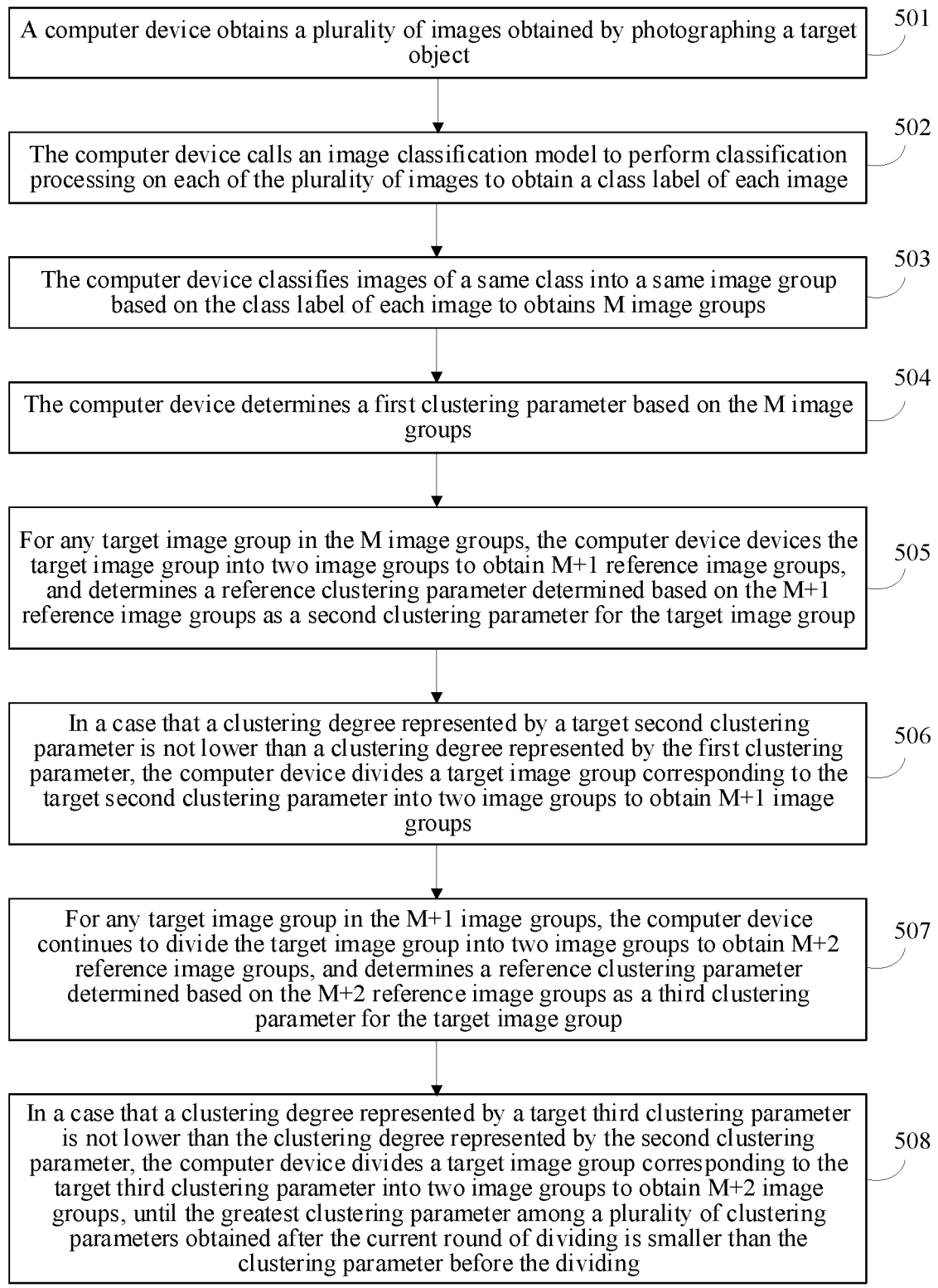
FIG. 5 is a flowchart of an image clustering method according to an embodiment of this application.

FIG. 5 is a flowchart of an image clustering method according to an embodiment of this application. An execution subject of the embodiment of this application is a computer device. In some embodiments, the computer device may be the terminal or the server in the above embodiment corresponding to FIG. 1. Referring to FIG. 5, the method includes the following steps:

501. The computer device obtains a plurality of images obtained by photographing a target object.

The computer device obtains a plurality of images, where the plurality of images are obtained by photographing a same target object. For example, the target object is a human body, and then the plurality of images may be obtained by photographing different organs of the same human body; or the target object is an organ, and then the plurality of images may be obtained by photographing different parts of the same organ; or the target object is a scenario, and then the plurality of images may be obtained by photographing the same scenario at different time points. In some embodiments, in the medical field, the plurality of images may be digital pathology whole slide images (WSIs), the digital pathology WSIs are images obtained by imaging a pathology microscope slide through a digital pathology imaging instrument, and the digital pathology imaging instrument includes an optical systems, a linear scanning camera, and other components.

502. The computer device calls an image classification model to separately classify the plurality of images to obtain a class label of each image.

The image classification model is stored in the computer device, and the image classification model is configured to classify images. In some embodiments, the image classification model may be a Convolutional Neural Network (CNN). See the above embodiment corresponding to FIG. 3 for the detailed network structure of the image classification model. See the following embodiment corresponding to FIG. 8 for a detailed training process of the image classification model, which will not be described here. After obtaining the plurality of images, the computer device calls the image classification model to separately classify each image in the plurality of images to obtain the class label of each image, where the class label of an image can represent the class to which the image belongs.

In a possible implementation, as shown in FIG. 3, the image classification model includes the first feature extraction network and the image classification network, and the first feature extraction network is connected to the image classification network. For each image in the plurality of images, the computer device calls the first feature extraction network to perform feature extraction on the image to obtain a first image feature, and calls the image classification network to perform classification processing based on the first image feature to obtain the class label of the image.

An input of the first feature extraction network is an image, and an input of the image classification network is an output of the first feature extraction network. In some embodiments, the image classification network is a neural network including two fully-connected layers. The first image feature outputted by the first feature extraction network is used for representing the feature of the image, for example, the first image feature is a multi-dimensional feature vector matrix, or the first image feature is an image used for representing a feature.

In another possible implementation, the images are pathology slide images, the first feature extraction network includes K feature extraction layers and a feature conversion layer, the feature extraction layers are configured to extract image features, and the feature conversion layer is configured to convert the image features. The computer device calls the K feature extraction layers to perform feature extraction on the images in sequence to obtain the image feature outputted by each feature extraction layer, and calls the feature conversion layer to perform feature conversion on the image features outputted by the last L feature extraction layers to obtain the first image feature, L being an integer greater than 1 and not greater than K. In the first feature extraction network, the K feature extraction layers are sequentially connected, and the feature conversion layer is separately connected to the last L feature extraction layers.

Specifically, in an arrangement order from front to back, the K feature extraction layers extract the image features from a shallow layer to a deep layer in sequence. Considering that classification of the pathology slide images depends more on morphological information and texture information of a distribution condition of nuclei in the images and the information needs to be obtained form the image features extracted from a shallow layer network, during feature conversion, feature conversion is performed on the image features outputted by the last L feature extraction layers, instead of only on the image feature outputted by the last feature extraction layer, such that the finally obtained first image feature not only includes the image feature of the deep layer outputted by the last feature extraction layer but also includes the image features of relative shallow layers outputted by the feature extraction layers before the last feature extraction layer, thereby improving the feature extraction capability of the first feature extraction network for the pathology slide images.

In some embodiments, the feature extraction layers in the first feature extraction network are convolution layers, the feature conversion layer is a fully-connected layer, a pooling layer is further connected between the last L feature extraction layers and the feature conversion layer, and the pooling layer is configured to perform pooling processing on the image features extracted by the feature extraction layers. As shown in FIG. 6, the first feature extraction network includes convolution layer 601 to convolution layer 604 and a fully-connected layer 605; pooling layers are further respectively connected between the last three convolution layers (i.e., convolution layer 602 to convolution layer 604) and the fully-connected layer 605; the computer device inputs a pathology slide image into the convolution layer 601 of the first feature extraction network, the image feature outputted from the convolution layer 601 is inputted into the convolution layer 602, the image feature outputted from the convolution layer 602 is separately inputted into the convolution layer 603 and the pooling layer 612, the image feature outputted from the convolution layer 603 is separately inputted into the convolution layer 604 and the pooling layer 613, and the image feature outputted from the convolution layer 604 is inputted into the pooling layer 614. The image features respectively outputted by the pooling layer 612, the pooling layer 613, and the pooling layer 614 are inputted into the fully-connected layer 605, and the fully-connected layer 605 performs feature conversion on the image features outputted by the three pooling layers to obtain the first image feature.

In some embodiments, the convolution layer in the first feature extraction network may include a residual neural network, GoogleNet (a neural network), a Visual Geometry Group Network (VGGnet) or other network structures.

503. The computer device classifies images of a same class into a same image group based on the class label of each image, to obtain M image groups.

After obtaining the class label of each image, the computer device can determine, based on the class label of each image, the class to which each image belongs. The computer device classifies images of a same class into a same image group to obtains M image groups, M being an integer greater than 1. Each image group includes at least one image; images belonging to a same image group belong to a same class, and the similarity between these images is high; and images belonging to different image groups belong to different classes, and the similarity between these images is low. Steps 501-503 are equivalent to performing image clustering on the plurality of obtained images to obtain a plurality of image groups, where each image group may be one cluster.

In some embodiments, the class label of an image includes a probability that the image belongs to each class. For each image, the class corresponding to the maximum probability in the class label of the image is determined as the class to which the image belongs.

In steps 501-503, the computer device first determines, through the image classification model, the class to which each image belongs, and then classifies the plurality of images into M image groups according to the class to which each image belongs. However, the number of classes that can be determined by the image classification model is fixed, for example, if the class labels outputted by the image classification model cover probabilities for K classes, M is not likely to be greater than K, which is equivalent to the fact that the number of the plurality of image groups obtained by clustering the plurality of images is limited. As a result, there may be a situation where the aggregation degree between images within a same image group is not high enough, resulting in that the clustering degree of images in the M image groups is not high enough. Therefore, the computer device needs to continue to execute the following steps 504-508 to further divide the M image groups.

504. The computer device determines a first clustering parameter based on the M image groups.

The computer device determines the first clustering parameter based on the M image groups, where the first clustering parameter represents a clustering degree of images in the M image groups. In general, the greater the first clustering parameter, the higher the clustering degree between images, and the smaller the first clustering parameter, the lower the clustering degree between images. The clustering degree reflects an aggregation degree between images in a same image group, and a separation degree between images in different image groups. The higher the aggregation degree between images in a same image group and the higher the separation degree between images in different image groups, the higher the clustering degree between the images in the M image groups.

In a possible implementation, the computer device determines the first clustering parameter based on the first image feature of the images in each of the M image groups, as shown in FIG. 7, including the following steps:

701. For each image in the M image groups, the computer device determines an aggregation parameter and a separation parameter corresponding to the image, based on the first image feature of the image, first image features of the other images in an image group to which the image belongs, and first image features of images in the other image groups. The aggregation parameter represents a dissimilarity degree between the image and the other images in the image group to which the image belongs, and the separation parameter represents a dissimilarity degree between the image and images in the other image groups.

The computer device determines the aggregation parameter corresponding to the image, based on the first image feature of the image, and the first image features of the other images in the image group to which the image belongs. The computer device determines the separation parameter corresponding to the image, based on the first image feature of the image, and the first image features of the images in the image groups other than the image group to which the image belongs.

For example, for each of the other image groups, the computer device can determine a candidate separation parameter between the image and each of the other image groups based on the first image feature of the image, and the first image features of the images in each of the other image groups. Accordingly, the minimum candidate separation parameter between the image and the other image groups is determined, and the minimum candidate separation parameter is determined as the separation parameter corresponding to the image.

For example, the computer device can determine the distance between the image and each of the other images based on the first image feature of the image and the first image features of the other images in the image group to which the image belongs, and then determine the mean value of the distances between the image and the other images as the aggregation parameter corresponding to the image. The smaller the distance between the image and the other images, the higher the similarity between the image and the other images in the same image group, and the smaller the aggregation parameter corresponding to the image. Therefore, the smaller the aggregation parameter corresponding to an image, the lower the dissimilarity degree between the image and the other images in an image group to which the image belongs, and the higher the clustering degree of the image group.

For example, for each of the other image groups, the computer device can determine the distance between the image and each image in each of the other images based on the first image feature of the image and the first image feature of each image in each of the other image groups, and then determine the mean value of the distances between the image and a plurality of images in each of the other image groups as a candidate separation parameter between the image and each of the other image groups. Accordingly, among the candidate separation parameters between the image and the other image groups, the minimum candidate separation parameter is determined as the separation parameter corresponding to the image. The greater the distance between the image and the images in the other image groups, the lower the similarity between the image and the images in the other image groups, and the greater the separation parameter corresponding to the image. Therefore, the greater the separation parameter corresponding to an image, the higher the dissimilarity degree between the image and the images in the other image groups, and the higher the clustering degree of the image group. The distance between images may be a cosine distance, a Euclidean distance or the like, which is not limited in the embodiment of this application.

702. The computer device determines a clustering sub-parameter corresponding to the image based on the aggregation parameter and the separation parameter, where the clustering sub-parameter is negatively correlated with the aggregation parameter, and the clustering sub-parameter being positively correlated with the separation parameter.

The greater the aggregation parameter, the smaller the clustering sub-parameter corresponding to the image, and the smaller the aggregation parameter, the greater the clustering sub-parameter corresponding to the image; the greater the separation parameter, the greater the clustering sub-parameter corresponding to the image, and the smaller the separation parameter, the smaller the clustering sub-parameter corresponding to the image. The greater the clustering sub-parameter corresponding to the image, the higher the clustering degree of the image.

In some embodiments, the computer device uses the following formula to determine the clustering sub-parameter corresponding to an image:

$$SC(i) = \frac{b(i) - a(i)}{\max(a(i), b(i))};$$

where i represents the image, SC (i) represents the clustering sub-parameter corresponding to the image, a (i) represents the aggregation parameter corresponding to the image, and b (i) represents the separation parameter corresponding to the image.

703. The computer device determines the first clustering parameter based on respective clustering sub-parameters of the images in the M image groups.

The computer device determines the clustering sub-parameter corresponding to each image, and determines the first clustering parameter based on the respective clustering sub-parameters of the images. In some embodiments, the computer device determines the mean value of the respective clustering sub-parameters of the images as the first clustering parameter.

In some embodiments, the closer the first clustering parameter is to 1, the smaller the distance between a plurality of images in a same image group, the greater the distance between a plurality of images in different image groups, and the higher the clustering degree of images in the M image groups. The closer the first clustering parameter is to −1, the greater the distance between a plurality of images in a same image group, the smaller the distance between a plurality of images in different image groups, and the smaller the clustering degree of images in the M image groups.

505. For any target image group in the M image groups, the computer device divides the target image group into two image groups to obtain M+1 reference image groups, and determines a reference clustering parameter based on the M+1 reference image groups as a second clustering parameter for the target image group.

Each image group in the M image groups can be used as a target image group. For any target image group in the M image groups, the computer device divides the target image group into two image groups, and determines the reference clustering parameter based on the M+1 reference image groups as the second clustering parameter for the target image group, where the second clustering parameter represents a clustering degree of images in the M+1 reference image groups. The computer device performs the operation in step 202 for each image group in the M image groups, such that the second clustering parameter for each image group in the M image groups can be obtained, that is, M second clustering parameters can be obtained.

For example, M is 3, and the M image groups include an image group 1, an image group 2, and an image group 3. The computer device divides the image group 1 into an image group 11 and an image group 12, and determines a second clustering parameter a based on the image group 11, the image group 12, the image group 2, and the image group 3. The computer device divides the image group 2 into an image group 21 and an image group 22, and determines a second clustering parameter b based on the image group 1, the image group 21, the image group 22, and the image group 3. The computer device divides the image group 3 into an image group 31 and an image group 32, and determines a second clustering parameter c based on the image group 1, the image group 2, the image group 31, and the image group 32. As a result, 3 second clustering parameters are obtained, including the second clustering parameter a of the image group 1, the second clustering parameter b of the image group 2, and the second clustering parameter c of the image group 3.

In some embodiments, the computer device uses any clustering algorithm such as a spectral clustering algorithm, a k-means algorithm (an unsupervised clustering algorithm), or an expectation maximization clustering algorithm based on a Gaussian Mixed Model (GMM), to divide the target image group into two new image groups.

506. When a clustering degree represented by a target second clustering parameter is not lower than a clustering degree represented by the first clustering parameter, the computer device divides a target image group corresponding to the target second clustering parameter into two image groups to obtain M+1 image groups, where the target second clustering parameter is the second clustering parameter representing the highest clustering degree among respective second clustering parameters of the M image groups.

Since the second clustering parameters represent the clustering degrees of images in the M+1 reference image groups, the computer device can determine the target second clustering parameter representing the highest clustering degree among the obtained second clustering parameters of the M image groups. After the target image group corresponding to the target second clustering parameter is divided into two image groups, the obtained clustering degree of the images of the M+1 reference image groups is the highest. The computer device compares the clustering degree represented by the target second clustering parameter with the clustering degree represented by the first clustering parameter. When the clustering degree represented by the target second clustering parameter is not lower than the clustering degree represented by the first clustering parameter, after the target image group corresponding to the target second clustering parameter is divided into two image groups, the clustering degree of images is not lower than the clustering degree of the images of the original M image groups. As a result, the computer device divides the target image group corresponding to the target second clustering parameter into two image groups to obtain M+1 image groups.

In another embodiment, when the clustering degree represented by the target second clustering parameter is lower than the clustering degree represented by the first clustering parameter, after the target image group corresponding to the target second clustering parameter is divided into two image groups, the clustering degree of images is lower than the clustering degree of the images of the original M image groups. As a result, the computer device no longer divides any image group in the M image groups, and the following steps 507 and 508 do no need to be performed.

507. For any target image group in the M+1 image groups, the computer device continues to divide the target image group into two image groups to obtain M+2 reference image groups, and determines a reference clustering parameter based on the M+2 reference image groups as a third clustering parameter for the target image group.

After obtaining the M+1 image groups, for any target image group in the M+1 image groups, the computer device continues to divide the target image group into two image groups to obtain M+2 reference image groups, and determines a reference clustering parameter based on the M+2 reference image groups as a third clustering parameter for the target image group, where the third clustering parameter represents a clustering degree of the M+2 reference image groups. The computer device performs the operation in step 507 for each image group in the M+1 image groups, such that the third clustering parameter for each image group in the M+1 image groups can be obtained, that is, M+1 third clustering parameters are obtained.

The process of determining the third clustering parameter in step 507 is the same as the process of determining the second clustering parameter in step 505 above, and thus will not be repeated here.

508. When a clustering degree represented by a target third clustering parameter is not lower than the clustering degree represented by the target second clustering parameter, the computer device divides a target image group corresponding to the target third clustering parameter into two image groups to obtain M+2 image groups, until the greatest clustering parameter among a plurality of clustering parameters obtained after the current round of dividing is smaller than the clustering parameter before the dividing.

The process for the computer device to obtain M+2 image groups in step 508 is the same as the process of obtaining the M+1 image groups in step 506 above, and thus will not be repeated here.

After obtaining the M+2 image groups, the computer device continues to divide any target image group in the M+2 image groups, re-determines the clustering parameter, and then determines, depending on the value of the clustering parameter, whether to continue to divide the M+2 image groups into M+3 image groups. That is, the computer device executes a plurality of iteration processes. Steps 505 and 506 and steps 507 and 508 each refer to one iteration process. In the current round of iteration process, when among a plurality of clustering parameters obtained after the current round of dividing, a clustering degree represented by a target clustering parameter (i.e., the clustering parameter obtained after the current round of dividing and representing the highest clustering degree) is lower than a clustering degree represented by a target clustering parameter before dividing (i.e., the clustering parameter obtained after the previous round of dividing and representing the highest clustering degree), it means that the clustering degree obtained after dividing any of current image groups is lower than the clustering degree before dividing. Therefore, the computer device stops the iteration process and completes further dividing of the M image groups.

For example, the original M image groups are $C=\{c_i\}$, $c_i \in [0, 1, \ldots, M-1]$; in each round of iteration process, a plurality of image groups before dividing are defined as $C_{prev}$; a plurality of image groups after dividing are defined as $C_{cur}$; the number of the plurality of image groups after dividing is defined as K; the clustering parameters corresponding to $C_{prev}$ are defined as $SC_{prev}$; the clustering parameters corresponding to $C_{cur}$ are defined as $SC_{cur}$. The parameters are initialized as: $C_{prev}=C_{cur}=C$ and K=M, the following iteration process is executed, and iteration is stopped until an iteration termination condition is satisfied:

(1) for the current M image groups, $SC_{cur}^i$, $i \in [1, 2, \ldots, M]$ obtained by dividing each image group into two image groups is separately determined, the maximum value is determined among M $SC_{cur}^i$, and the maximum value is recorded as $SC_{cur}^{\bar{i}}$. The image group $\bar{i}$ is divided into two image groups, and the obtained M+1 image groups are recorded as new $C_{cur}=\{c_i\}$, $c_i \in [0, 1, \ldots, M]$.

(2) When $SC_{cur}^{\bar{i}} \geq SC_{prev}$, it means that dividing the image group $\bar{i}$ into 2 image groups can improve the clustering degree of images. Then the computer device divides the image group $\bar{i}$ into two image groups, updates $C_{prev}=C_{cur}$, K=M+1, and executes the next round of iteration process. When $SC_{cur}^{\bar{i}} < SC_{prev}$, exit the iteration process, and the finally obtained $C_{cur}=\{c_i\}$, $c_i \in [0, 1, \ldots, M]$ is used as a result of image clustering.

The embodiment of this application includes two processes. One is image clustering based on an image classification model, where a plurality of images without class labels are processed by using an end-to-end image classification model to obtain a class label for each image, thereby achieving preliminary image clustering; and the other is image clustering based on clustering parameters, where based on clustering parameters, a plurality of current image groups are further divided to distinguish image groups distributed more tightly, and when a clustering degree represented by each clustering parameter after the dividing is lower than a clustering degree represented by each clustering parameter before the dividing, further dividing of the image groups is terminated and a final clustering result is obtained.

According to the method provided in the embodiment of this application, a second clustering parameter obtained after each image group in M image groups is divided into two new image groups is separately determined; and when a clustering degree represented by a target second clustering parameter (the second clustering parameter representing the highest clustering degree) is not lower than a clustering degree represented by a first clustering parameter before the dividing, it means that dividing an image group corresponding to the target second clustering parameter into two new image groups can improve the clustering degree of images in the image group, such that the image group is divided into two new image groups to obtain M+1 image groups, thereby achieving further division of the M image groups, facilitating further distinguishing confusable images, and then improving the clustering degree of image clustering.

Moreover, an image classification model is first called to determine class labels of a plurality of images, and the plurality of images are classified into M image groups based on the class labels to achieve preliminary image clustering of the plurality of images; and then the M image groups are further divided based on clustering parameters to achieve more accurate image clustering of the plurality of images. The use of a combination of the two approaches improves both the efficiency of image clustering and the clustering degree of image clustering.

Furthermore, feature conversion is performed on image features outputted by the last L feature extraction layers, such that the finally obtained first image feature not only includes the image feature of a deep layer outputted by the last feature extraction layer but also includes image features of relative shallow layers outputted by the feature extraction layers before the last feature extraction layer, thereby improving the feature extraction capability of a first feature extraction network for pathology slide images.

Figure 8:
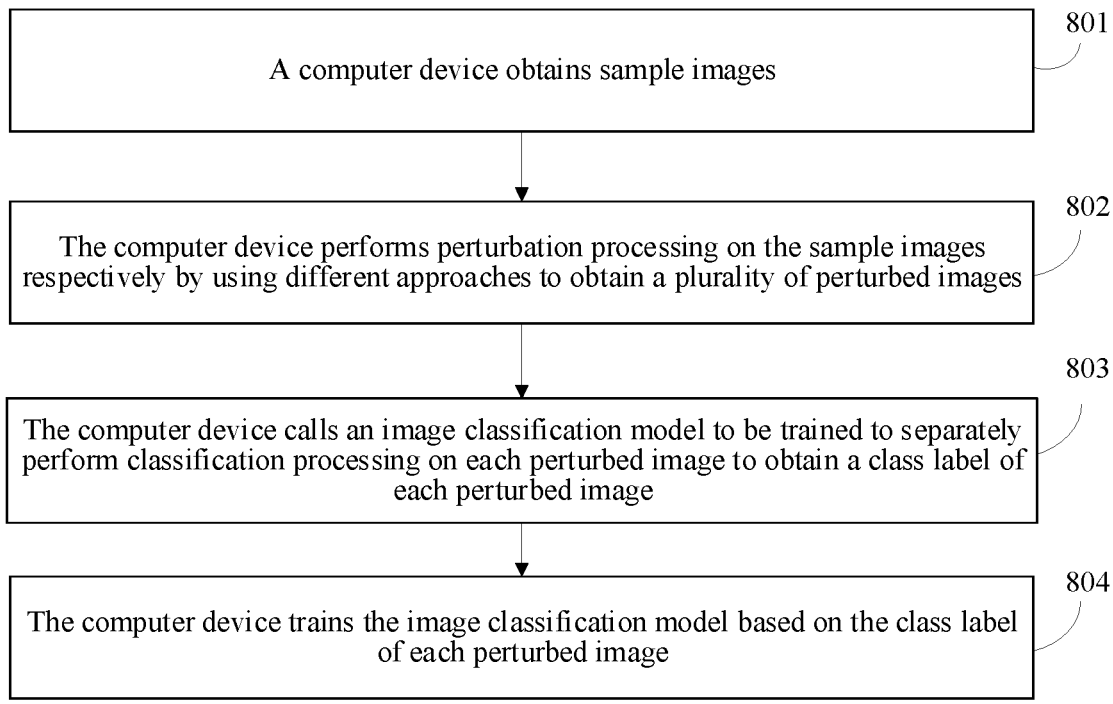
FIG. 8 is a flowchart of a model training method according to an embodiment of this application.

FIG. 8 is a flowchart of a model training method according to an embodiment of this application. An image classification model trained in the embodiment of this application can be applied to the above embodiment shown in FIG. 5. An execution subject of the method is a computer device. In some embodiments, the computer device may be the terminal or the server in the above embodiment corresponding to FIG. 1. Referring to FIG. 8, the method includes the following steps:

801. The computer device obtains sample images.

The sample images can be any type of images, and can be sample images obtained using any method. For example, the computer device obtains a plurality of pathology slide images of different organs of different human bodies, cuts each pathology slide image into a plurality of image blocks of a same size, and uses a plurality of image blocks obtained after conversion as the sample images.

The sample images in the embodiment of this application are images without real class labels, and the training method in the embodiment of this application is a training method for unsupervised learning based on unlabeled sample images.

802. The computer device performs perturbation processing on the sample images respectively by using different approaches to obtain a plurality of perturbed images.

The computer device uses the approach of perturbation processing to enhance randomness of the sample images. The computer device performs perturbation processing on the sample images respectively by using different approaches to obtain a plurality of different perturbed images.

Different perturbation processing approaches may include different perturbation types, and the perturbation types include color dithering, Gaussian blur, rotation, cropping a partial area and then zooming to an original size, etc. Each perturbation processing can include only one perturbation type, or can include a plurality of perturbation types. In some embodiments, every time perturbation processing is performed on the sample image, a plurality of perturbation types are traversed. For the currently traversed perturbation type, the computer device determines, according to a probability of occurrence of the perturbation type, whether the perturbation type is selected this time, if yes, performs perturbation processing according to the perturbation type and continues to traverse the next perturbation type, and if not, does not need to perform perturbation processing according to the perturbation type and directly traverses the next perturbation type until the last perturbation type is traversed, such that the sample image is subjected to one perturbation processing by using a combination of a plurality of perturbation types, and a perturbed image is obtained. Then, according to the above steps, the computer device continues to perform another perturbation processing on the sample image to obtain another perturbed image. In some embodiments, the probability of occurrence of each perturbation type can be set to 0.5 to enhance the randomness of the perturbed image.

Taking respectively performing two perturbation processes on two sample images as an example, the computer device selects a plurality of perturbation types according to the probability of occurrence of each perturbation approach, and respectively performs perturbation processing on the two sample images according to the plurality of perturbation types selected this time to obtain two perturbed images; and then the computer device selects a plurality of perturbation types according to the probability of occurrence of each perturbation approach again, and respectively performs perturbation processing on the two sample images according to the plurality of perturbation types selected this time to obtain two perturbed images again. As a result, the computer device finally obtains four perturbed images.

803. The computer device calls an image classification model to be trained to separately perform classification processing on each perturbed image to obtain a class label of each perturbed image.

In a possible implementation, the image classification model includes a first feature extraction network and an image classification network. For each perturbed image, the computer device calls the first feature extraction network to perform feature extraction on the perturbed image to obtain a second image feature, and calls the image classification network to perform classification processing based on the second image feature to obtain the class labels of the perturbed image. The class label is a dummy label predicted by the image classification model, instead of a true class label of the perturbed image.

In another possible implementation, as shown in FIG. 4, the image classification model further includes a second feature extraction network. After obtaining the second image feature, the computer device further calls the second feature extraction network to perform feature extraction on the second image feature to obtain a third image feature.

The second feature extraction network is connected to the first feature extraction network. The first feature extraction network and the second feature extraction network are both configured to extract image features, and the difference lies in that the first feature extraction network extracts features of images, and the second feature extraction network extracts features of image features. Compared with the first image feature extracted by the first feature extraction network, the second image feature extracted by the second feature extraction network is a deeper feature. The third image features in the embodiment of this application can be used for training the image classification model. For the process of using the third image features to train the image classification model, see step 804 below for details, which will not be described here.

The processes of obtaining the second image features and the class labels of the perturbed images in step 803 are the same as the processes of obtaining the first image features and the class labels of the images in step 502 above, and thus will not be repeated here.

804. The computer device trains the image classification model based on the class label of each perturbed image.

After obtaining the class label of each perturbed image, the computer device trains the image classification model based on the class label of each perturbed image, to improve the classification capability of the image classification model. The trained image classification model can perform classification processing on any given image to obtain the class label of the image. In some embodiments, the class label includes a probability that the image belongs to each class. The class corresponding to the maximum probability in the class label is the class to which the image belongs.

In a possible implementation, a plurality of sample images are provided, and the class label of each perturbed image includes the probability that the perturbed images belong to each class. The computer device obtains a plurality of perturbed images obtained by performing perturbation processing on a same sample image, and determines a first difference parameter between probabilities that the plurality of perturbed images obtained belong to a same class; obtains a plurality of perturbed images obtained by perturbation processing on different sample images, and determines a second difference parameter between probabilities that the plurality of perturbed images obtained belong to a same class; and trains an image classification model based on the first difference parameter and the second difference parameter, such that the first difference parameter obtained by calling the trained image classification model decreases, and the second difference parameter obtained by calling the trained image classification model increases.

For a plurality of perturbed images obtained by preforming perturbation processing on a same sample image, since the plurality of perturbed images come from the same sample image, the class to which the plurality of perturbed images belong may be the same as the class to which the sample image belongs, that is, the classes to which the plurality of images belong are also the same. The class labels of the perturbed images are predicted by the image classification model, and when the accuracy of the image classification model is high enough, for each class, the probabilities that the plurality of perturbed images belong to the class are close enough. Therefore, the computer device determines the first difference parameter between the probabilities that the plurality of perturbed images belongs to a same class. The smaller the first difference parameter, the closer the probabilities that the plurality of perturbed images belong to a same class, and thus the more accurate the image classification model. Therefore, the computer device trains the image classification model based on the first difference parameter, such that the first difference parameter decreases, and then the classification capability of the image classification model is improved.

For a plurality of perturbed images obtained by preforming perturbation processing on different sample images, since the plurality of perturbed images come from different sample images, the classes to which the plurality of perturbed images belong are respectively the same as the classes to which the sample images belong, that is, the classes to which the plurality of images belong are different. The class labels of the perturbed images are predicted by the image classification model, and when the accuracy of the image classification model is high enough, for each class, the difference between the probabilities that the plurality of perturbed images belong to the class is great enough. Therefore, the computer device determines a second difference parameter between the probabilities that the plurality of perturbed images belongs to a same class. The greater the second difference parameter, the greater the difference between the probabilities that the plurality of perturbed images belong to a same class, and thus the more accurate the image classification model. Therefore, the computer device trains the image classification model based on the second difference parameter, such that the second difference parameter increases, and then the classification capability of the image classification model is improved.

In another possible implementation, the image classification model further includes a second feature extraction network. In step 803 above, after obtaining the second image feature, the computer device further calls the second feature extraction network to perform feature extraction on the second image feature to obtain a third image feature. Then, the computer device can further train the image classification model based on the third image feature of each perturbed image.

In some embodiments, a plurality of sample images are provided. Then the process of training the image classification model based on the third image feature of each perturbed image includes: the computer device obtains a plurality of perturbed images obtained by performing perturbation processing on a same sample image, and determines a third difference parameter between obtained third image features of the plurality of disturbed images; obtains a plurality of perturbed images obtained by perturbation processing on different sample images, and determines a fourth difference parameter between obtained third image features of the plurality of perturbed images; and trains the image classification model based on the third difference parameter and the fourth difference parameter, such that the third difference parameter obtained by calling the trained image classification model decreases, and the fourth difference parameter obtained by calling the trained image classification model increases.

For a plurality of perturbed images obtained by preforming perturbation processing on a same sample image, since the plurality of perturbed images come from the same sample image, the image features of the plurality of perturbed images are similar to the image features of the sample image, that is, the image features of the plurality of images are also similar. When the accuracy of the image classification model is high enough, the image feature of each perturbed image extracted by the image classification model is close enough. Therefore, the computer device determines the third difference parameter between the third image features of the plurality of perturbed images. The smaller the third difference parameter, the closer the third image features of the plurality of perturbed images, and thus the more accurate the image classification model. Therefore, the computer device trains the image classification model based on the third difference parameter, such that the third difference parameter decreases, and then the classification capability of the image classification model is improved.

For a plurality of perturbed images obtained by preforming perturbation processing on different sample images, since the plurality of perturbed images come from different sample images, the image features of the plurality of perturbed images are similar to the image features of the different sample images, that is, the image features of the plurality of images are not similar. When the accuracy of the image classification model is high enough, the difference in the image feature of each perturbed image extracted by the image classification model is great enough. Therefore, the computer device determines the fourth difference parameter between the third image features of the plurality of perturbed images. The greater the fourth difference parameter, the greater the difference between the third image features of the plurality of perturbed images, and thus the more accurate the image classification model. Therefore, the computer device trains the image classification model based on the fourth difference parameter, such that the fourth difference parameter increases, and then the classification capability of the image classification model is improved.

In some embodiments, the computer device determines a first loss value based on the first difference parameter and the second difference parameter, determines a second loss value based on the third difference parameter and the fourth difference parameter, and performs weighted summation on the first loss value and the second loss value to obtain a target loss value. The computer device trains the image classification model based on the target loss value, such that a target loss value obtained by calling the trained image classification model decreases.

The first loss value is positively correlated with the first difference parameter, and the first loss value is negatively correlated with the second difference parameter. That is, the greater the first difference parameter, the greater the first loss value, the smaller the first difference parameter, the smaller the first loss value, the greater the second difference parameter, the smaller the first loss value, and the smaller the second difference parameter, the greater the first loss value. The second loss value is positively correlated with the third difference parameter, and the third loss value is negatively correlated with the fourth difference parameter. That is, the greater the third difference parameter, the greater the second loss value, the smaller the third difference parameter, the smaller the second loss value, the greater the fourth difference parameter, the smaller the second loss value, and the smaller the fourth difference parameter, the greater the second loss value. In some embodiments, respective weight coefficients of the first loss value and the second loss value are 0.5.

In the embodiment of this application, the feature extraction capability of the image classification model and the capability to distinguish images of different classes are improved by performing contrastive learning based on perturbed images from the same sample image and performing contrastive learning based on perturbed images from different sample images. The use of contrastive learning enables unsupervised training for the image classification model, where manual labeling of sample images is not required, such that labor and time are saved, mislabeling caused by manual labeling can be avoided, ad thus the efficiency and accuracy of training of the image classification model are improved.

In a possible implementation, since the process of training the image classification model in the embodiment of this application is unsupervised training, there is no real sample class label during the training process, and thus the image classification model can only determine the probability that an image belongs to each class but cannot determine the real meaning of each class. In some embodiments, the computer device does not need to determine the real meaning of each class, and only needs to use the image classification model to classify a plurality of images into different classes in the subsequent process. In some embodiments, after classifying a plurality of images into different classes by using the image classification model, the computer device manually determines the real meaning of each class based on the classification result. For example, in the medical field, the image classification model can classify pathology slide images into seven classes, where each class represents a physiological tissue type, and then a doctor determines, according to the classification result, the physiological tissue type represented by each class.

Steps 801-804 above are exemplified in only one iteration process. In the process of training an image processing model, iterative training needs to be performed multiple times. In a possible implementation, the computer device stops training the image classification model in response to the number of iteration rounds reaching a first threshold; or, stops training the image classification model in response to a loss value obtained in the current iteration round being not greater than a second threshold. Both the first threshold and the second threshold can be set according to actual needs, for example, the first threshold is 10 or 15, and the second threshold is 0.01 or 0.02.

In the embodiment of this application, training the image classification model includes the following contents:

(1) data to be prepared: an unlabeled sample image set, the total number E of iterations of model training, the number N of sample images processed in each iteration, a randomness enhancement strategy, weight coefficients $\tau_I$ and $\tau_C$ of loss values, the number M of classes, and an image classification model, where the image classification model includes a first feature extraction network $f_\omega$, a second feature extraction network $ip_{\hat{\omega}}$, and an image classification network $cp_{\overline{\omega}}$, where $\omega$, $\hat{\omega}$, $\overline{\omega}$ are respectively network parameters. The total number E of iterations and the number N of sample images are both integers, for example, E is greater than 100, and N is greater than 128.

(2) Network structure: the first feature extraction network $f_\omega$ is a neural network, an input is 224*224*3-dimensional sample images, and an output is 512*1-dimensional image features. The second feature extraction network $ip_{\hat{\omega}}$ and the image classification network $cp_{\overline{\omega}}$ further project the image features outputted by the first feature extraction network $f_\omega$ into different spaces, so as to perform contrastive learning optimization on the features and performing contrastive learning optimization on the classes, respectively. An input of the second feature extraction network $ip_{\hat{\omega}}$ is the 512*1-dimensional image features, and an output is 128*1-dimensional image features; an input of the image classification network $cp_{\overline{\omega}}$ is the 512*1-dimensional image features, and an output is M*1-dimensional class labels. The second feature extraction network $ip_{\hat{\omega}}$ is a neural network composed of two fully-connected layers, the input is 512*1-dimensional, an middle layer is 512*1-dimensional, and the output is 128*1-dimensional. The image classification network $cp_{\overline{\omega}}$ is a neural network composed of two fully-connected layers, the input is 512*1-dimensional, the middle layer is 512*1-dimensional, and the output is M*1-dimensional.

Figure 9:
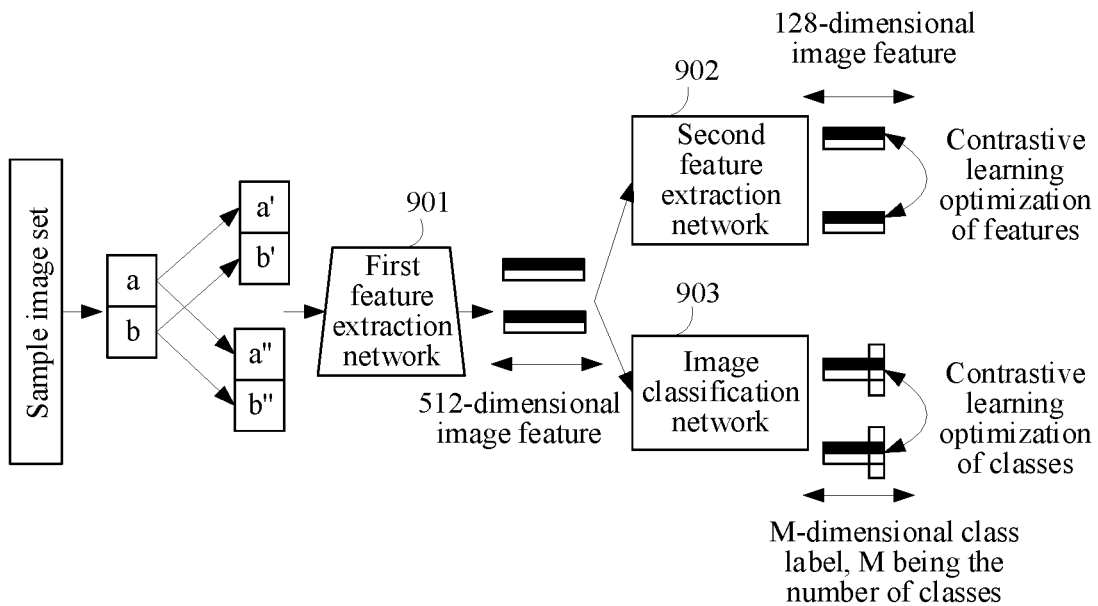
FIG. 9 is a schematic diagram of training an image classification model according to an embodiment of this application.

(3) Training process: FIG. 9 is a schematic diagram of training an image classification model according to an embodiment of this application. As shown in FIG. 9, in an iterative training process, sample image a and sample image b are obtained from a sample image set, and perturbed image a', perturbed image b', perturbed image a" and perturbed image b" are obtained after sample image a and sample image b are perturbed using different approaches. The first feature extraction network 901 is called to separately perform feature extraction on each perturbed image to obtain a 512-dimensional image feature of each perturbed image, the second feature extraction network 902 is called to perform feature extraction on the 512-dimensional image feature to obtain a 128-dimensional image feature, and the image classification network 903 is called to perform classification processing on the 512-dimensional image feature to obtain an M-dimensional class label. The computer device performs contrastive learning optimization at the feature dimension based on the image features outputted by the second feature extraction network 902, and performs contrastive learning optimization at the class dimension based on the class labels outputted by the image classification network 903.

In the method provided in the embodiment of this application, the feature extraction capability of the image classification model and the capability to distinguish images of different classes are improved by performing contrastive learning based on perturbed images from the same sample image and by performing contrastive learning based on perturbed images from different sample images. The use of contrastive learning enables unsupervised training for the image classification model, where manual labeling of sample images is not required, such that labor and time are saved, mislabeling caused by manual labeling can be avoided, ad thus the efficiency and accuracy of training of the image classification model are improved.

Figure 10:
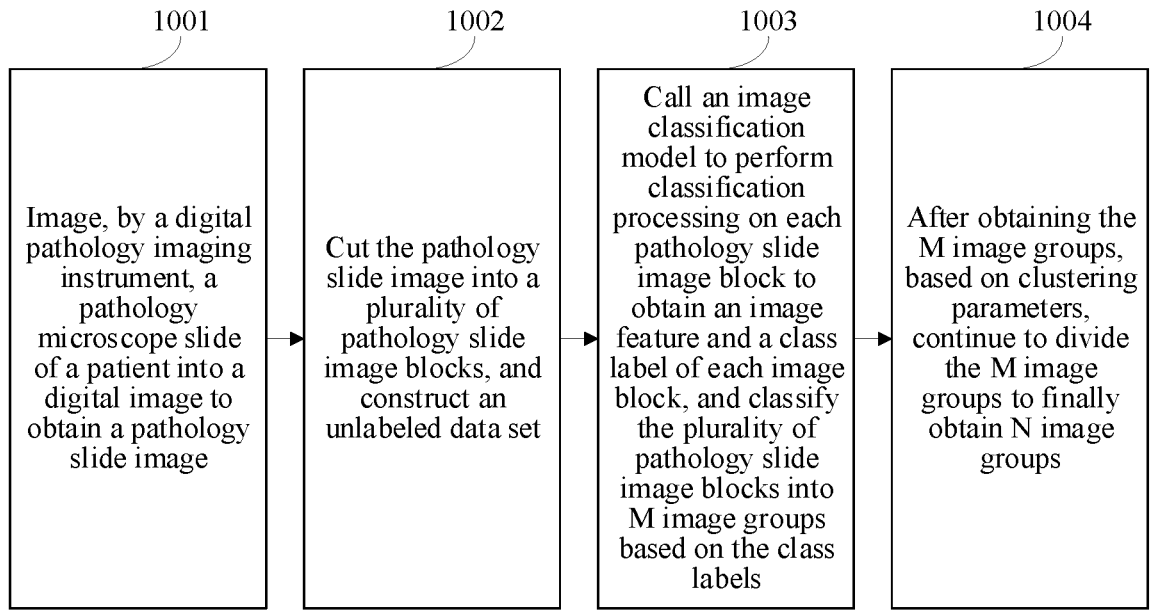
FIG. 10 is a flowchart of another image clustering method according to an embodiment of this application.

The above embodiment can be applied to any scenario where image clustering is needed, to perform image clustering on any class of images. For example, in the medical field, image clustering is performed on a plurality of pathology slide images of a patient according to the physiological tissue type. FIG. 10 is a flowchart of an image clustering method according to an embodiment of this application. Referring to FIG. 10, the method includes the following steps:

1001. image, by a digital pathology imaging instrument, a pathology microscope slide of a patient into a digital image to obtain a pathology slide image;

1002. cut the pathology slide image into a plurality of pathology slide image blocks, and construct an unlabeled data set;

1003. call an image classification model to perform classification processing on each pathology slide image block to obtain an image feature and a class label of each image block, and classify the plurality of pathology slide image blocks into M image groups based on the class labels; and 1004. after obtaining the M image groups, based on clustering parameters, continue to divide the M image groups to finally obtain N image groups.

In the embodiment of this application, image clustering can be performed on the unlabeled pathology slide image blocks, the plurality of pathology slide image blocks are classified into a plurality of image groups, and each image group represents one type of physiological tissue, thereby providing support for a subsequent pathological analysis task. For example, the pathological analysis task includes: performing abnormality prediction or prognosis processing based on the proportion of the amount of physiological tissue. By comparing an image group for a certain type of tissue with an image group for normal tissue, whether the tissue is abnormal is determined, and each image group corresponds to one type of physiological tissue.

In addition to performing image clustering on pathology slide images according to the type of physiological tissue, image clustering may also be performed on pathology slide images according to other criteria. For example, image clustering is performed on pathology slide images according to the quality class, where the mass type, for example, includes uneven staining, slide thickness, knife vibration, slide wrinkle or the like. Or, image clustering is performed on pathology slide images according to the cell type, where the cell type, for example, includes suspicious cells, normal cells or the like.

Figure 11:
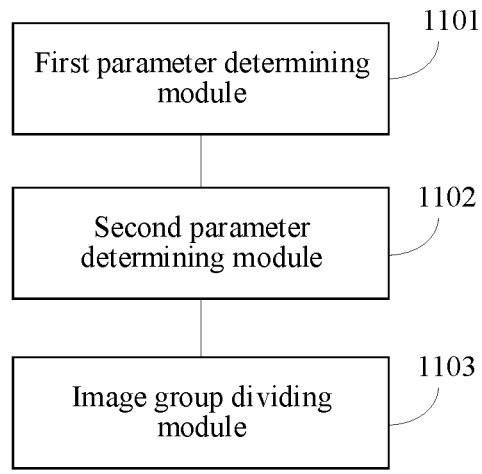
FIG. 11 is a schematic structural diagram of an image clustering apparatus according to an embodiment of this application.

FIG. 11 is a schematic structural diagram of an image clustering apparatus according to an embodiment of this application. Referring to FIG. 11, the apparatus includes:

- a first parameter determining module 1101, configured to determine a first clustering parameter based on M image groups, the first clustering parameter representing a clustering degree of images in the M image groups, and M being an integer greater than 1;
- a second parameter determining module 1102, configured to, for any target image group in the M image groups, divide the target image group into two image groups to obtain M+1 reference image groups, and determine a reference clustering parameter based on the M+1 reference image groups as a second clustering parameter for the target image group, the second clustering parameter representing a clustering degree of images in the M+1 reference image groups; and
- an image group dividing module 1103, configured to, when a clustering degree represented by a target second clustering parameter is not lower than the clustering degree represented by the first clustering parameter, divide a target image group corresponding to the target second clustering parameter into two image groups to obtain M+1 image groups, the target second clustering parameter being the second clustering parameter representing the highest clustering degree among respective second clustering parameters of the M image groups.

According to the image clustering apparatus provided in the embodiment of this application, a second clustering parameter obtained after each image group in M image groups is divided into two new image groups is separately determined; and when a clustering degree represented by a target second clustering parameter is not lower than a clustering degree represented by a first clustering parameter before the dividing, it means that dividing an image group corresponding to the target second clustering parameter into two new image groups can improve the clustering degree of images in the image group, such that the image group is divided into two new image groups to obtain M+1 image groups, thereby achieving further division of the M image groups, facilitating further distinguishing confusable images, and then improving the clustering degree of image clustering.

Figure 12:
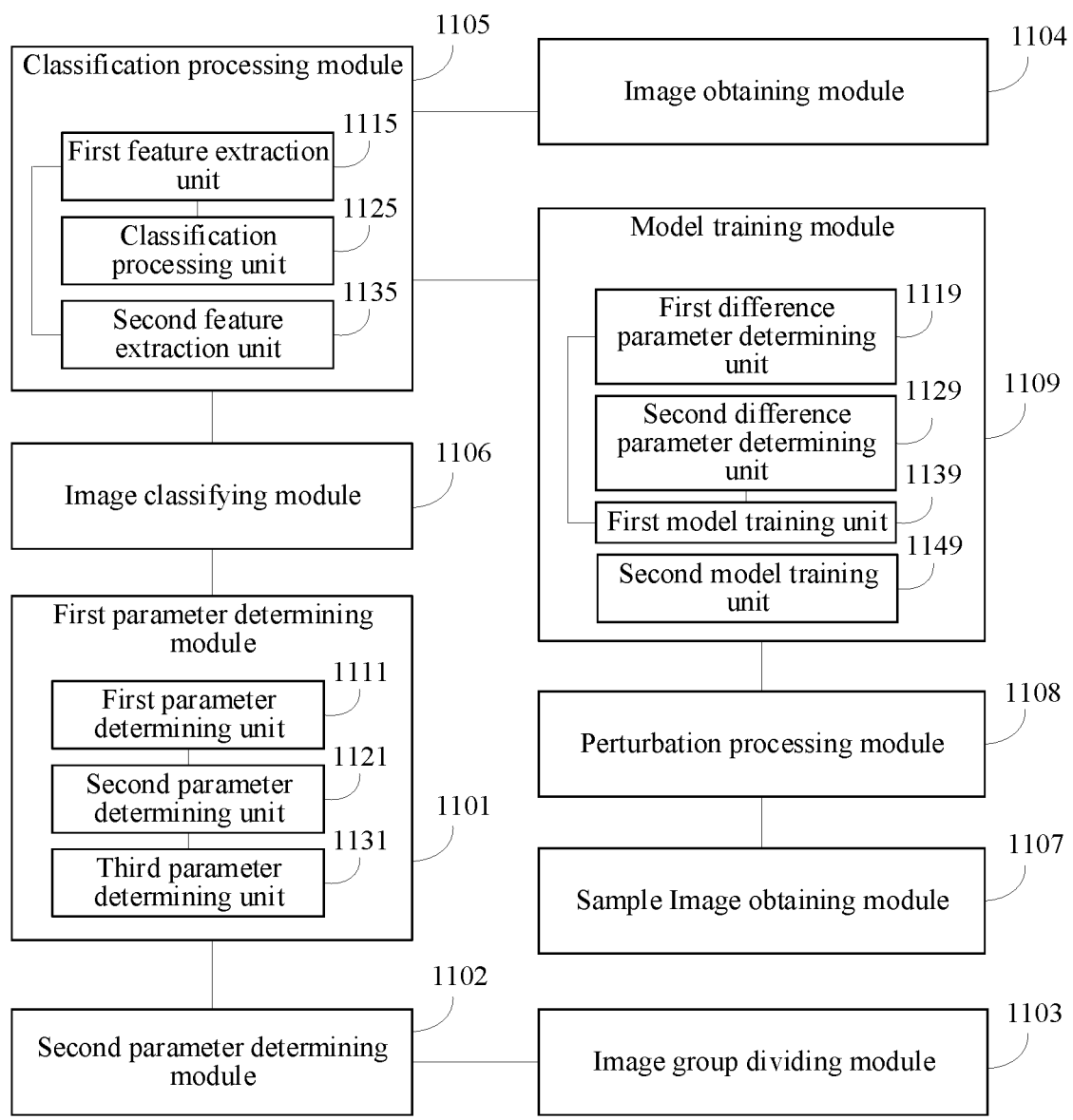
FIG. 12 is a schematic structural diagram of another image clustering apparatus according to an embodiment of this application.

In some embodiments, referring to FIG. 12, the second parameter determining module 1102 is further configured to:

for any target image group in the M+1 image groups, divide the target image group into two image groups to obtain M+2 reference image groups, and determine a reference clustering parameter based on the M+2 reference image groups as a third clustering parameter for the target image group, the third clustering parameter representing a clustering degree of images in the M+2 reference image groups.

The image group dividing module 1103 is further configured to, when a clustering degree represented by a target third clustering parameter is not lower than the clustering degree represented by the target second clustering parameter, divide a target image group corresponding to the target third clustering parameter into two image groups to obtain M+2 image groups, the target third clustering parameter being the third clustering parameter representing the highest clustering degree among respective third clustering parameters of the M+1 image groups; and when the clustering degree represented by the target third clustering parameter is lower than the clustering degree represented by the target second clustering parameter, determine that image clustering processing for the image groups is completed.

In some embodiments, referring to FIG. 12, the apparatus further includes:

- an image obtaining module 1104, configured to obtain a plurality of images obtained by photographing a target object;
- a classification processing module 1105, configured to call an image classification model to separately classify the plurality of images to obtain a class label of each image; and
- an image classifying module 1106, configured to classify images of a same class into a same image group based on the respective class labels of the plurality of images to obtain M image groups.

In some embodiments, referring to FIG. 12, the image classification model includes a first feature extraction network and an image classification network, and the classification processing module 1105 includes:

- a first feature extraction unit 1115, configured to call the first feature extraction network for each image in the plurality of images, and perform feature extraction on the image to obtain a first image feature; and
- a classification processing unit 1125, configured to call the image classification network to perform classification processing based on the first image feature to obtain a class label of the image.

In some embodiments, referring to FIG. 12, the first parameter determining module 1101 includes:

- a first parameter determining unit 1111, configured to, for each image in the M image groups, determine an aggregation parameter and a separation parameter corresponding to the image, based on the first image feature of the image, first image features of the other images in an image group to which the image belongs, and first image features of images in the other image groups, the aggregation parameter representing a degree of dissimilarity between the image and the other images in the image group to which the image belongs, and the separation parameter representing a degree of dissimilarity between the image and the images in the other image groups;
- a second parameter determining unit 1121, configured to determine, based on the aggregation parameter and the separation parameter, a clustering sub-parameter corresponding to the image, the clustering sub-parameter being negatively correlated with the aggregation parameter, and the clustering sub-parameter being positively correlated with the separation parameter; and
- a third parameter determining unit 1131, configured to determine the first clustering parameter based on the respective clustering sub-parameters of the images in the M image groups.

In some embodiments, referring to FIG. 12, the images are pathology slide images. The first feature extraction network includes K feature extraction layers and a feature conversion layer. The first feature extraction unit 1115 is configured to:

call the K feature extraction layers to sequentially perform feature extraction on the image to obtain an image feature outputted by each feature extraction layer; and call the feature conversion layer to perform feature conversion on the image features outputted by the last L feature extraction layers to obtain the first image feature, L being an integer greater than 1 and not greater than the K.

In some embodiments, referring to FIG. 12, the apparatus further includes:

a sample image obtaining module 1107, configured to obtain sample images;

a perturbation processing module 1108, configured to perform perturbation processing on the sample images respectively by using different approaches to obtain a plurality of perturbed images;

the classification processing module 1105, further configured to call an image classification model to be trained to separately perform classification processing on each perturbed image to obtain a class label of each perturbed image; and a model training module 1109, configured to train the image classification model based on the class label of each perturbed image.

In some embodiments, referring to FIG. 12, a plurality of sample images are provided, the class labels of the perturbed images include probabilities that the perturbed images belong to each class, and the model training module 1109 includes:

a first difference parameter determining unit 1119, configured to obtain a plurality of perturbed images obtained by performing perturbation processing on a same sample image, and determine a first difference parameter between probabilities that the plurality of perturbed images obtained belong to a same class;

a second difference parameter determining unit 1129, configured to obtain a plurality of perturbed images obtained by performing perturbation processing on different sample images, and determine a second difference parameter between probabilities that the plurality of perturbed images obtained belong to a same class; and a first model training unit 1139, configured to train the image classification model based on the first difference parameter and the second difference parameter, such that the first difference parameter obtained by calling the trained image classification model decreases and the second difference parameter obtained by calling the trained image classification model increases.

In some embodiments, referring to FIG. 12, the image classification model includes a first feature extraction network and an image classification network, and the classification processing module 1105 includes:

the first feature extraction unit 1115, configured to for each perturbed image, call the first feature extraction network to perform feature extraction on the perturbed image to obtain a second image feature; and the classification processing unit 1125, configured to call the image classification network to perform classification processing based on the second image feature to obtain a class label of the perturbed image.

In some embodiments, referring to FIG. 12, the image classification model further includes a second feature extraction network; the classification processing module 1105 further includes:

a second feature extraction unit 1135, configured to call the second feature extraction network to perform feature extraction on the second image feature to obtain a third image feature; and the model training module 1109 includes:

a second model training unit 1149, configured to train the image classification model based on the third image feature of each perturbed image.

In some embodiments, referring to FIG. 12, a plurality of sample images are provided, and the second model training unit 1149 is configured to:

obtain a plurality of perturbed images obtained by performing perturbation processing on a same sample image, and determine a third difference parameter between obtained third image features of the plurality of disturbed images;

obtain a plurality of perturbed images obtained by performing perturbation processing on different sample images, and determine a fourth difference parameter between obtained third image features of the plurality of perturbed images; and train the image classification model based on the third difference parameter and the fourth difference parameter, such that the third difference parameter obtained by calling the trained image classification model decreases and the fourth difference parameter obtained by calling the trained image classification model increases.

When performing image clustering, the image clustering apparatus provided in the above embodiment is exemplified by division of the various functional modules above. In practical application, the function allocations above can be achieved by different functional modules according to requirements. That is, the internal structure of a computer device is divided into different functional modules, so as to complete all or some of the functions described above. In addition, the image clustering apparatus provided in the above embodiment and the image clustering method embodiments fall within a same conception. For a specific implementation process, see the method embodiments for details, and details are not described herein again.

An embodiment of this application further provides a computer device. The computer device includes a processor and a memory, the memory has at least one computer program stored therein, and the at least one computer program is loaded and executed by the processor to implement the operations executed in the image clustering method in the above embodiments.

Figure 13:
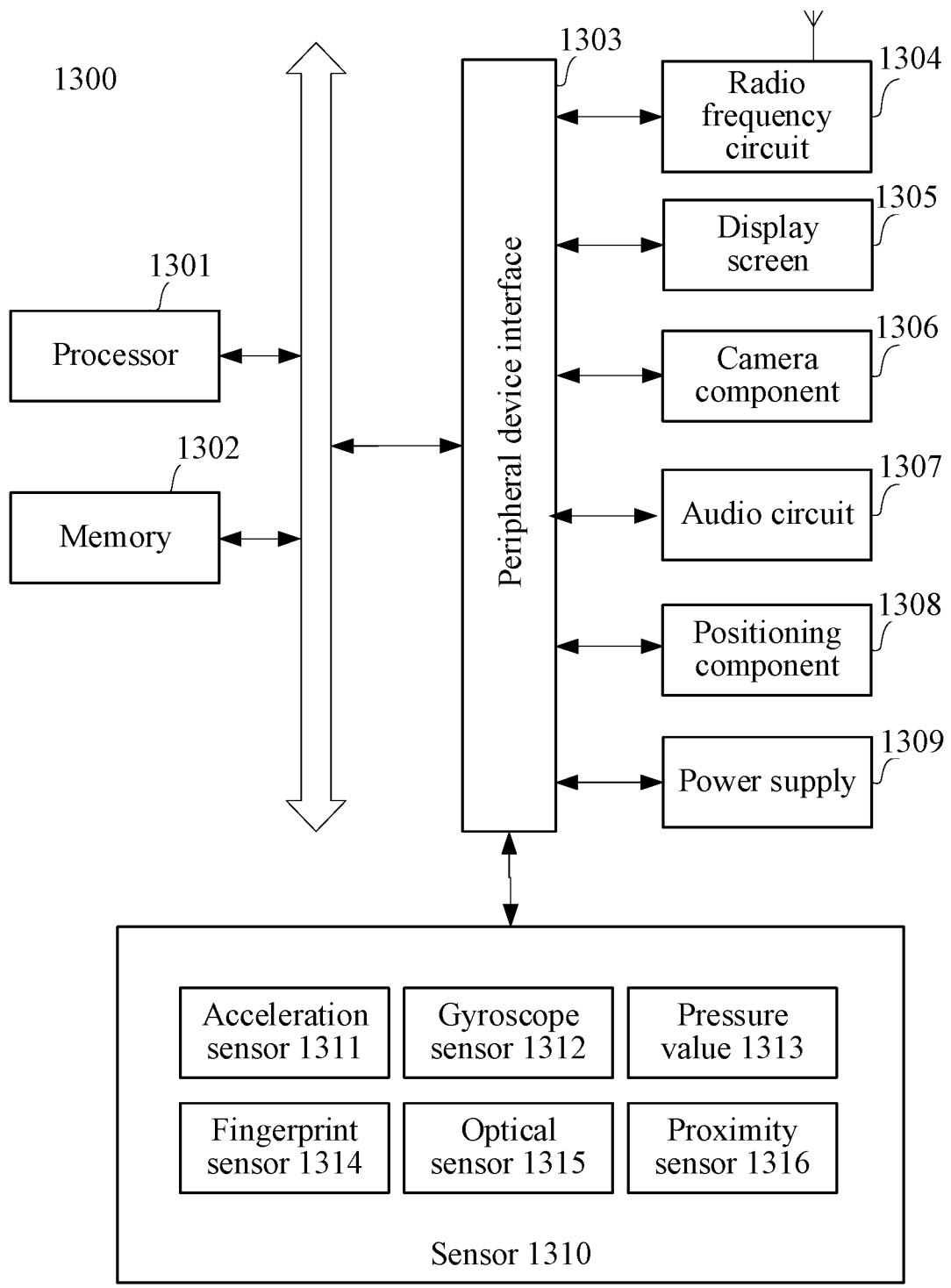
FIG. 13 is a schematic structural diagram of a terminal according to an embodiment of this application.

In some embodiments, the computer device is provided as a terminal. FIG. 13 shows a schematic structural diagram of a terminal 1300 according to an exemplary embodiment of this application.

The terminal 1300 includes: a processor 1301 and a memory 1302.

The processor 1301 may include one or more processing cores, for example, a 4-core processor or an 8-core processor. The processor 1301 may be implemented in at least one hardware form of Digital Signal Processing (DSP), a Field Programmable Gate Array (FPGA), and a Programmable Logic Array (PLA). The processor 1301 may also include a main processor and a coprocessor; the main processor is a processor configured to process data in an awake state, and is also referred to as a Central Processing Unit (CPU); and the coprocessor is a low-power-consumption processor configured to process data in a standby state. In some embodiments, the processor 1301 may be integrated with a Graphics Processing Unit (GPU), and the GPU is configured to render and draw content that needs to be displayed on a display screen. In some embodiments, the processor 1301 may further include an artificial intelligence (AI) processor, and the AI processor is configured to process machine learning-computing operations.

The memory 1302 may include one or more computer-readable storage media, and the computer-readable storage medium may be non-transient. The memory 1302 may further include a high-speed random access memory and a nonvolatile memory, for example, one or more disk storage devices or flash storage devices. In some embodiments, the non-transitory computer-readable storage medium in the memory 1302 is configured to store at least one computer program, and the at least one computer program is configured to be executed by the processor 1301 to implement the image clustering method provided in the method embodiments of this application.

In some embodiments, alternatively, the terminal 1300 may further include: a peripheral device interface 1303 and at least one peripheral device. The processor 1301, the memory 1302, and the peripheral interface 1303 may be connected through a bus or a signal wire. Each peripheral device may be connected to the peripheral device interface 1303 through a bus, a signal wire, or a circuit board. In some embodiments, the peripheral device includes: at least one of a radio frequency circuit 1304, a display screen 1305, a camera component 1306, an audio circuit 1307, a positioning component 1308, and a power supply 1309.

In some embodiments, the terminal 1300 further includes one or more sensors 1310. The one or more sensors 1310 include, but are not limited to: an acceleration sensor 1311, a gyroscope sensor 1312, a pressure sensor 1313, a fingerprint sensor 1314, an optical sensor 1315, and a proximity sensor 1316.

A person skilled in the art may understand that the structure shown in FIG. 13 constitutes no limitation to the terminal 1300, and the terminal may include more or fewer components than those shown in the figure, or some components may be combined, or a different component arrangement may be used.

Figure 14:
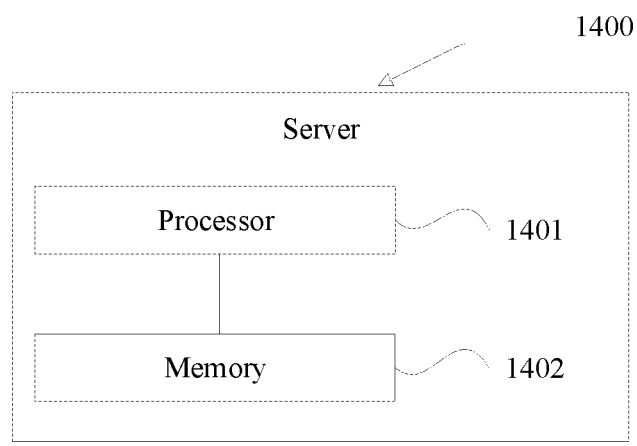
FIG. 14 is a schematic structural diagram of a server according to an embodiment of this application.

In some embodiments, the computer device may be provided as a server. FIG. 14 is a schematic structural diagram of a server according to an embodiment of this application. The server 1400 may vary a lot due to different configurations or performance, and may include one or more Central Processing Units (CPUs) 1401 and one or more memories 1402. The memory 1402 stores at least one computer program, and the at least one computer program is loaded and executed by the CPU 1401 to implement the provided method in the above method embodiments. Certainly, the server may further include components such as a wired or wireless network interface, a keyboard, and an input/output interface, to conveniently perform input and output. The server may further include other components configured to implement device functions. Details are not described herein again.

An embodiment of this application further provides a computer-readable storage medium. The computer-readable storage medium has at least one computer program stored therein, and the at least one computer program is loaded and executed by a processor to implement the operations executed in the image clustering method described in the above embodiments.

An embodiment of this application further provides a computer program product or a computer program. The computer program product or the computer program includes computer program code, the computer program code is stored in a computer-readable storage medium, a processor of a computer device reads the computer program code from the computer-readable storage medium, and the processor executes the computer program code, such that the computer device implements the operations executed in the image clustering method in the above embodiments. In some embodiments, a computer program involved in the embodiments of this application may be deployed on a single computer device so as to be executed, or deployed on a plurality of computer devices at one location so as to be executed, or deployed on a plurality of computer devices distributed at a plurality of locations and interconnected through a communication network so as to be executed, where the plurality of computer devices distributed at a plurality of locations and interconnected through a communication network can form a blockchain system.

A person skilled in the art may understand that all or some of the steps of the above embodiments may be implemented by hardware, or may be implemented by a program instructing relevant hardware, the program may be stored in a computer-readable storage medium, and the storage medium may be a read-only memory, a magnetic disk, an optical disc, or the like.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The above descriptions are merely optional embodiments of the embodiments of this application, but are not intended to limit the embodiments of this application, any modification, equivalent replacement, or improvement made within the spirit and principle of the embodiments of this application shall fall within the protection scope of the embodiments of this application.

What is claimed is:

1. An image clustering method performed by a computer device, the method comprising:

determining a first clustering parameter based on M image groups, the first clustering parameter representing a clustering degree of images in the M image groups, and M being an integer greater than 1;

for a target image group in the M image groups, dividing the target image group into two image groups to obtain M+1 reference image groups, and determining a reference clustering parameter based on the M+1 reference image groups as a second clustering parameter for the target image group, the second clustering parameter representing a clustering degree of images in the M+1 reference image groups;

choosing, among respective second clustering parameters of the M image groups, a target second clustering parameter representing the highest clustering degree of images in the M image groups; and when a clustering degree represented by the target second clustering parameter is not lower than the clustering degree represented by the first clustering parameter, dividing a target image group corresponding to the target second clustering parameter into two image groups to obtain M+1 image groups.

2. The method according to claim 1, wherein after the dividing a target image group corresponding to the target second clustering parameter into two image groups to obtain M+1 image groups, the method further comprises:

for a target image group in the M+1 image groups, dividing the target image group into two image groups to obtain M+2 reference image groups, and determining a reference clustering parameter based on the M+2 reference image groups as a third clustering parameter for the target image group, the third clustering parameter representing a clustering degree of images in the M+2 reference image groups;

choosing, among respective third clustering parameters of the M+1 image groups, a target third clustering parameter representing the highest clustering degree of the M+2 reference image groups;

when a clustering degree represented by the target third clustering parameter is not lower than the clustering degree represented by the target second clustering parameter, dividing a target image group corresponding to the target third clustering parameter into two image groups to obtain M+2 image groups; and when the clustering degree represented by the target third clustering parameter is lower than the clustering degree represented by the target second clustering parameter, determining that image clustering processing for the image groups is completed.

3. The method according to claim 1, wherein before the determining a first clustering parameter based on M image groups, the method further comprises:

obtaining a plurality of images obtained by photographing a target object;

performing classification processing on each of the plurality of images using an image classification model to obtain a class label of the image; and classifying images of a same class into a respective image group based on the respective class labels of the plurality of images to obtain the M image groups.

4. The method according to claim 3, wherein the image classification model comprises a first feature extraction network and an image classification network, and the performing classification processing on each of the plurality of images using an image classification model to obtain a class label of the image comprises:

for each image in the plurality of images, performing feature extraction on the image using the first feature extraction network to obtain a first image feature; and performing classification processing based on the first image feature using the image classification network to obtain a class label of the image.

5. The method according to claim 3, wherein the image classification model is trained by:

obtaining sample images;

performing perturbation processing on the sample images respectively by using different approaches to obtain a plurality of perturbed images;

calling an image classification model to be trained to separately perform classification processing on each perturbed image to obtain a class label of each perturbed image; and training the image classification model based on the class label of each perturbed image.

6. The method according to claim 5, wherein a plurality of sample images are provided, the class labels of the perturbed images comprise probabilities that the perturbed images belong to each class, and the training the image classification model based on the class label of each perturbed image comprises:

obtaining a plurality of perturbed images obtained by performing perturbation processing on a same sample image, and determining a first difference parameter between probabilities that the plurality of perturbed images obtained belong to a same class;

obtaining a plurality of perturbed images obtained by performing perturbation processing on different sample images, and determining a second difference parameter between probabilities that the plurality of perturbed images obtained belong to a same class; and training the image classification model based on the first difference parameter and the second difference parameter, such that the first difference parameter obtained by calling the trained image classification model decreases and the second difference parameter obtained by calling the trained image classification model increases.

7. The method according to claim 6, wherein the image classification model comprises a first feature extraction network and an image classification network, and the calling an image classification model to be trained to separately perform classification processing on each perturbed image to obtain a class label of each perturbed image comprises:

for each perturbed image, calling the first feature extraction network to perform feature extraction on the perturbed image to obtain a second image feature; and calling the image classification network to perform classification processing based on the second image feature to obtain a class label of the perturbed image.

8. A computer device, comprising a processor and a memory, the memory has at least one computer program stored therein, and the at least one computer program, when executed by the processor, causing the computer device to implement an image clustering method including:

determining a first clustering parameter based on M image groups, the first clustering parameter representing a clustering degree of images in the M image groups, and M being an integer greater than 1;

for a target image group in the M image groups, dividing the target image group into two image groups to obtain M+1 reference image groups, and determining a reference clustering parameter based on the M+1 reference image groups as a second clustering parameter for the target image group, the second clustering parameter representing a clustering degree of images in the M+1 reference image groups;

choosing, among respective second clustering parameters of the M image groups, a target second clustering parameter representing the highest clustering degree of images in the M image groups; and when a clustering degree represented by the target second clustering parameter is not lower than the clustering degree represented by the first clustering parameter, dividing a target image group corresponding to the target second clustering parameter into two image groups to obtain M+1 image groups.

9. The computer device according to claim 8, wherein after the dividing a target image group corresponding to the target second clustering parameter into two image groups to obtain M+1 image groups, the method further comprises:

for a target image group in the M+1 image groups, dividing the target image group into two image groups to obtain M+2 reference image groups, and determining a reference clustering parameter based on the M+2 reference image groups as a third clustering parameter for the target image group, the third clustering parameter representing a clustering degree of images in the M+2 reference image groups;

choosing, among respective third clustering parameters of the M+1 image groups, a target third clustering parameter representing the highest clustering degree of the M+2 reference image groups;

when a clustering degree represented by the target third clustering parameter is not lower than the clustering degree represented by the target second clustering parameter, dividing a target image group corresponding to the target third clustering parameter into two image groups to obtain M+2 image groups; and when the clustering degree represented by the target third clustering parameter is lower than the clustering degree represented by the target second clustering parameter, determining that image clustering processing for the image groups is completed.

10. The computer device according to claim 8, wherein before the determining a first clustering parameter based on M image groups, the method further comprises:

obtaining a plurality of images obtained by photographing a target object;

performing classification processing on each of the plurality of images using an image classification model to obtain a class label of the image; and classifying images of a same class into a respective image group based on the respective class labels of the plurality of images to obtain the M image groups.

11. The computer device according to claim 10, wherein the image classification model comprises a first feature extraction network and an image classification network, and the performing classification processing on each of the plurality of images using an image classification model to obtain a class label of the image comprises:

for each image in the plurality of images, performing feature extraction on the image using the first feature extraction network to obtain a first image feature; and performing classification processing based on the first image feature using the image classification network to obtain a class label of the image.

12. The computer device according to claim 10, wherein the image classification model is trained by:

obtaining sample images;

performing perturbation processing on the sample images respectively by using different approaches to obtain a plurality of perturbed images;

calling an image classification model to be trained to separately perform classification processing on each perturbed image to obtain a class label of each perturbed image; and training the image classification model based on the class label of each perturbed image.

13. The computer device according to claim 12, wherein a plurality of sample images are provided, the class labels of the perturbed images comprise probabilities that the perturbed images belong to each class, and the training the image classification model based on the class label of each perturbed image comprises:

obtaining a plurality of perturbed images obtained by performing perturbation processing on a same sample image, and determining a first difference parameter between probabilities that the plurality of perturbed images obtained belong to a same class;

obtaining a plurality of perturbed images obtained by performing perturbation processing on different sample images, and determining a second difference parameter between probabilities that the plurality of perturbed images obtained belong to a same class; and training the image classification model based on the first difference parameter and the second difference parameter, such that the first difference parameter obtained by calling the trained image classification model decreases and the second difference parameter obtained by calling the trained image classification model increases.

14. The computer device according to claim 13, wherein the image classification model comprises a first feature extraction network and an image classification network, and the calling an image classification model to be trained to separately perform classification processing on each perturbed image to obtain a class label of each perturbed image comprises:

for each perturbed image, calling the first feature extraction network to perform feature extraction on the perturbed image to obtain a second image feature; and calling the image classification network to perform classification processing based on the second image feature to obtain a class label of the perturbed image.

15. A non-transitory computer-readable storage medium, storing at least one computer program therein, and the at least one computer program, when executed by a processor of a computer device, causing the computer device to implement an image clustering method including:

determining a first clustering parameter based on M image groups, the first clustering parameter representing a clustering degree of images in the M image groups, and M being an integer greater than 1;

for a target image group in the M image groups, dividing the target image group into two image groups to obtain M+1 reference image groups, and determining a reference clustering parameter based on the M+1 reference image groups as a second clustering parameter for the target image group, the second clustering parameter representing a clustering degree of images in the M+1 reference image groups;

choosing, among respective second clustering parameters of the M image groups, a target second clustering parameter representing the highest clustering degree of images in the M image groups; and when a clustering degree represented by the target second clustering parameter is not lower than the clustering degree represented by the first clustering parameter, dividing a target image group corresponding to the target second clustering parameter into two image groups to obtain M+1 image groups.

16. The non-transitory computer-readable storage medium according to claim 15, wherein after the dividing a target image group corresponding to the target second clustering parameter into two image groups to obtain M+1 image groups, the method further comprises:

for a target image group in the M+1 image groups, dividing the target image group into two image groups to obtain M+2 reference image groups, and determining a reference clustering parameter based on the M+2 reference image groups as a third clustering parameter for the target image group, the third clustering parameter representing a clustering degree of images in the M+2 reference image groups;

choosing, among respective third clustering parameters of the M+1 image groups, a target third clustering parameter representing the highest clustering degree of the M+2 reference image groups;

when a clustering degree represented by the target third clustering parameter is not lower than the clustering degree represented by the target second clustering parameter, dividing a target image group corresponding to the target third clustering parameter into two image groups to obtain M+2 image groups; and when the clustering degree represented by the target third clustering parameter is lower than the clustering degree represented by the target second clustering parameter, determining that image clustering processing for the image groups is completed.

17. The non-transitory computer-readable storage medium according to claim 15, wherein before the determining a first clustering parameter based on M image groups, the method further comprises:
  obtaining a plurality of images obtained by photographing a target object;
  performing classification processing on each of the plurality of images using an image classification model to obtain a class label of the image; and
  classifying images of a same class into a respective image group based on the respective class labels of the plurality of images to obtain the M image groups.

18. The non-transitory computer-readable storage medium according to claim 17, wherein the image classification model comprises a first feature extraction network and an image classification network, and the performing classification processing on each of the plurality of images using an image classification model to obtain a class label of the image comprises:
  for each image in the plurality of images, performing feature extraction on the image using the first feature extraction network to obtain a first image feature; and
  performing classification processing based on the first image feature using the image classification network to obtain a class label of the image.

19. The non-transitory computer-readable storage medium according to claim 17, wherein the image classification model is trained by:
  obtaining sample images;
  performing perturbation processing on the sample images respectively by using different approaches to obtain a plurality of perturbed images;
  calling an image classification model to be trained to separately perform classification processing on each perturbed image to obtain a class label of each perturbed image; and
  training the image classification model based on the class label of each perturbed image.

20. The non-transitory computer-readable storage medium according to claim 19, wherein a plurality of sample images are provided, the class labels of the perturbed images comprise probabilities that the perturbed images belong to each class, and the training the image classification model based on the class label of each perturbed image comprises:
  obtaining a plurality of perturbed images obtained by performing perturbation processing on a same sample image, and determining a first difference parameter between probabilities that the plurality of perturbed images obtained belong to a same class;
  obtaining a plurality of perturbed images obtained by performing perturbation processing on different sample images, and determining a second difference parameter between probabilities that the plurality of perturbed images obtained belong to a same class; and
  training the image classification model based on the first difference parameter and the second difference parameter, such that the first difference parameter obtained by calling the trained image classification model decreases and the second difference parameter obtained by calling the trained image classification model increases.

* * * * *